(12) United States Patent
McMillan et al.

(10) Patent No.: US 6,661,418 B1
(45) Date of Patent: Dec. 9, 2003

(54) CHARACTER ANIMATION SYSTEM

(75) Inventors: Robert McMillan, Glasgow (GB); Matthew Caryl, Glasgow (GB); Christopher Ball, Glasgow (GB)

(73) Assignee: Digital Animations Limited (GB)

( * ) Notice: Subject to any disclaimer, the term of this patent is extended or adjusted under 35 U.S.C. 154(b) by 267 days.

(21) Appl. No.: 09/766,718

(22) Filed: Jan. 22, 2001

(51) Int. Cl.[7] .............................................. G06T 17/00
(52) U.S. Cl. ..................................................... 345/473
(58) Field of Search ................................. 345/473, 474, 345/156, 504, 949; 352/5, 12, 20, 50, 52, 54; 704/270, 275, 276, 235, 246, 260; 707/104.1, 102; 709/231, 232

(56) References Cited

U.S. PATENT DOCUMENTS

| | | | |
|---|---|---|---|
| 4,913,539 A | 4/1990 | Lewis | 352/87 |
| 5,657,426 A | 8/1997 | Waters et al. | 704/276 |
| 5,734,794 A | 3/1998 | White | 704/275 |
| 5,928,330 A * | 7/1999 | Goetz et al. | 709/231 |
| 6,369,821 B2 * | 4/2002 | Merrill et al. | 345/473 |

FOREIGN PATENT DOCUMENTS

| | | |
|---|---|---|
| EP | 0 993 197 A2 | 4/2000 |
| GB | 2 328 849 A | 3/1999 |
| WO | WO 97/36288 | 10/1997 |
| WO | WO 01/78067 | 10/2001 |

OTHER PUBLICATIONS

Joslin et al. "Advanced Real–Time Collaboration over the Internet" ACM 2000.*
Puri et al. "MPEG–4: An object–based multimedia coding standard supporting mobile applications" Mobile Networks and Applications 1998.*
V–Star Character Technology Preview 99 (a flyer published in Aug. 1999 by V–Star Inc., 6311 De Soto Ave., Woodland Hills, CA 91367).

* cited by examiner

Primary Examiner—Almis R. Jankus
(74) Attorney, Agent, or Firm—Piper Rudnick; Jefferson Perkins

(57) ABSTRACT

A system for generating an animated image of at least the head of a character which is speaking, with the face of the character having visible articulation or expression matching the words being spoken, is described. An input stream of marked up text comprising text to be spoken by the animated character and instructions representing behavioral features are combined in a modified text stream which includes randomization instructions to create random behavioural features. The modified text stream is processed to produce an audio stream representing the text being spoken and a sequence of phonemes corresponding to portions of the audio signal. The phoneme stream is mapped by phoneme to viseme mapping means to produce a stream of morph targets. The morph targets are, in turn, combined with further random movement instructions and these are then processed in an animation module to generate an animated image of at least the character's head. The animated image is displayed on a display synchronously with the audio signal from the audio stream so that as the animated character speaks, the mouth portion of the character's face matches the phonemes in the audio signal with the random movements adding to character realism. Embodiments of the invention are disclosed.

36 Claims, 112 Drawing Sheets

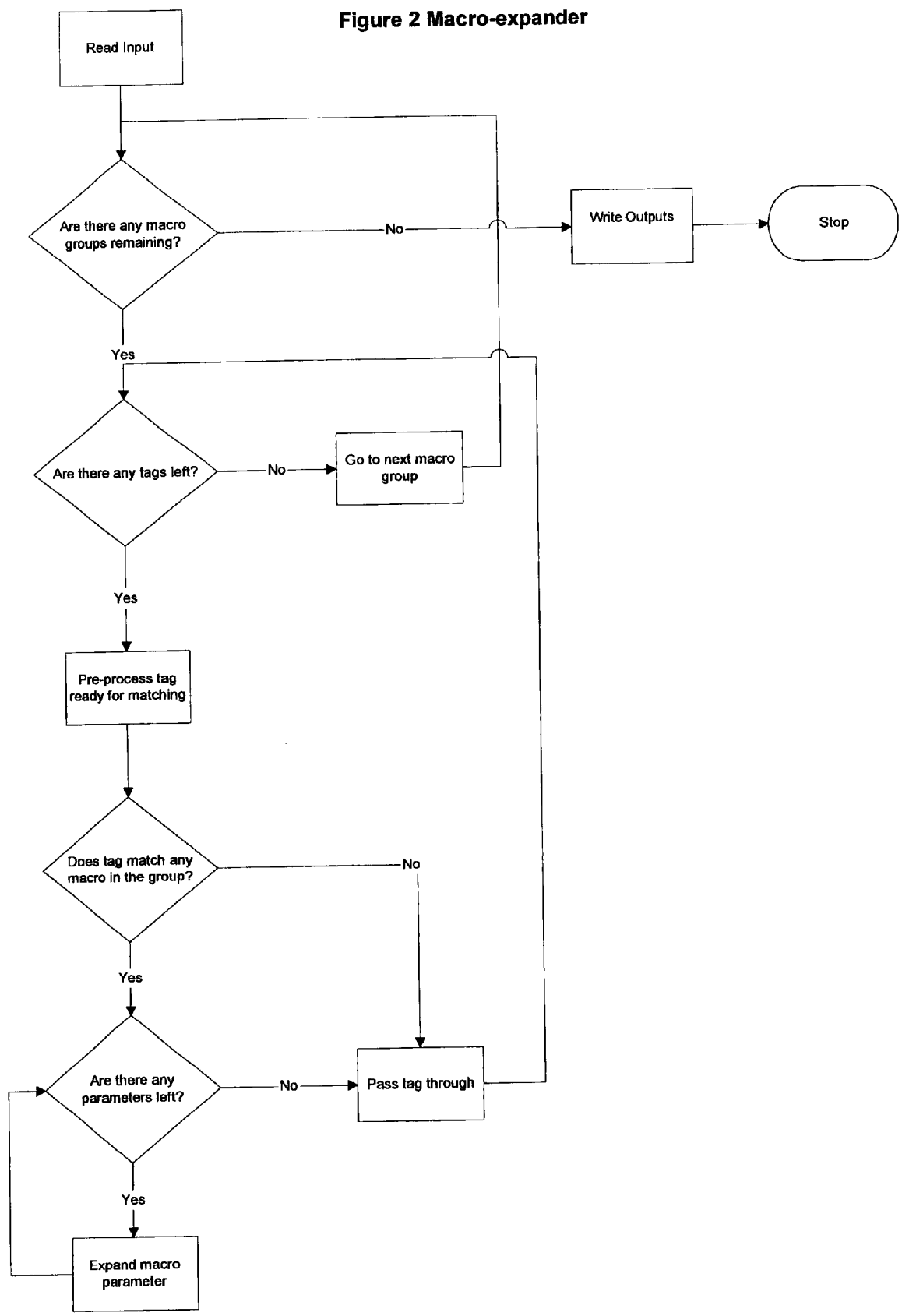

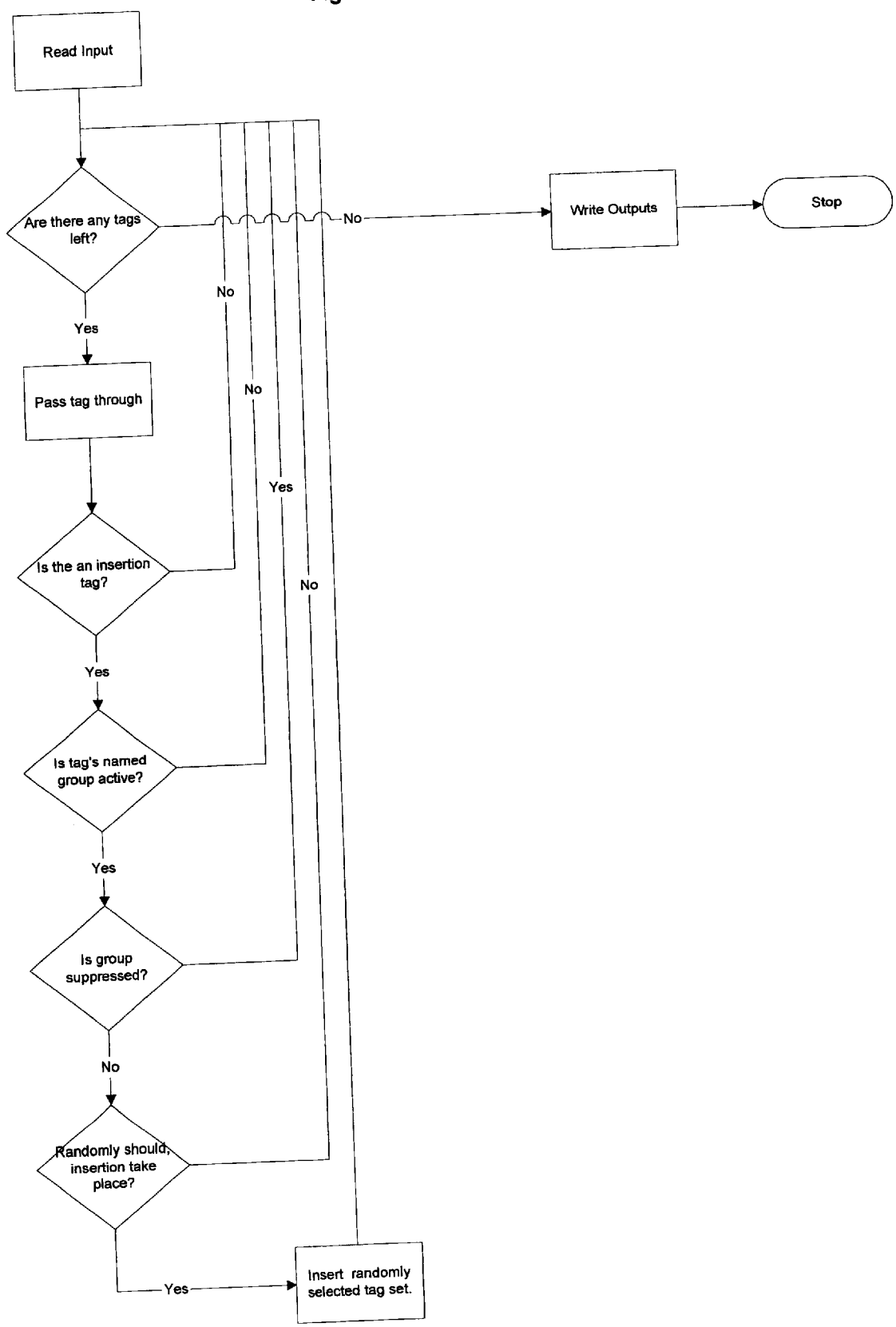
Figure 3 Random-inserter

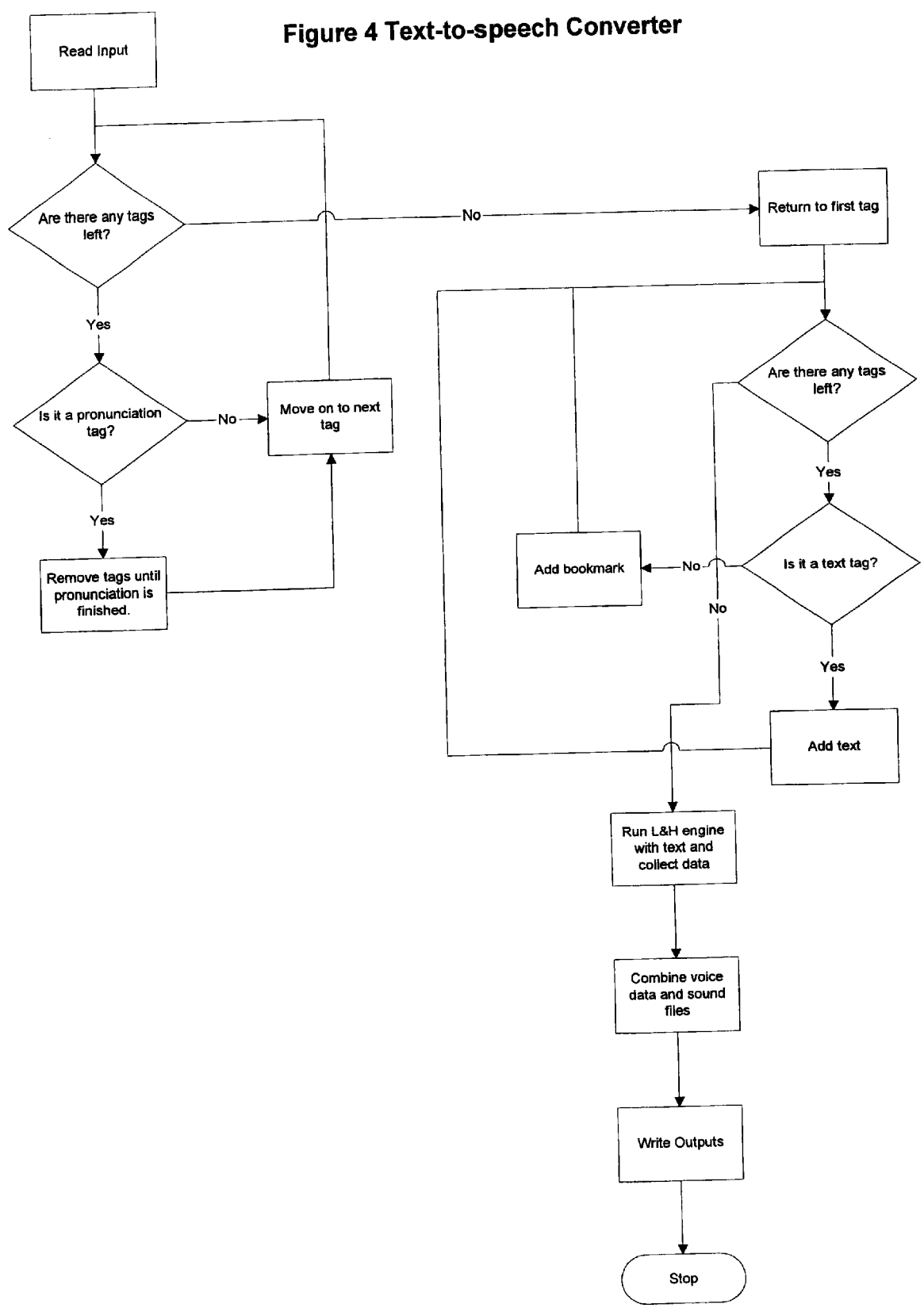

Figure 5 (a) Phoneme To Viseme.
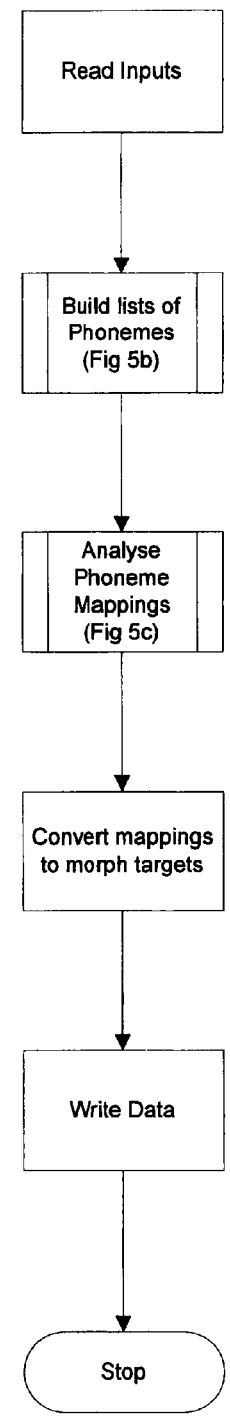

Figure 5(b) Phoneme to Viseme
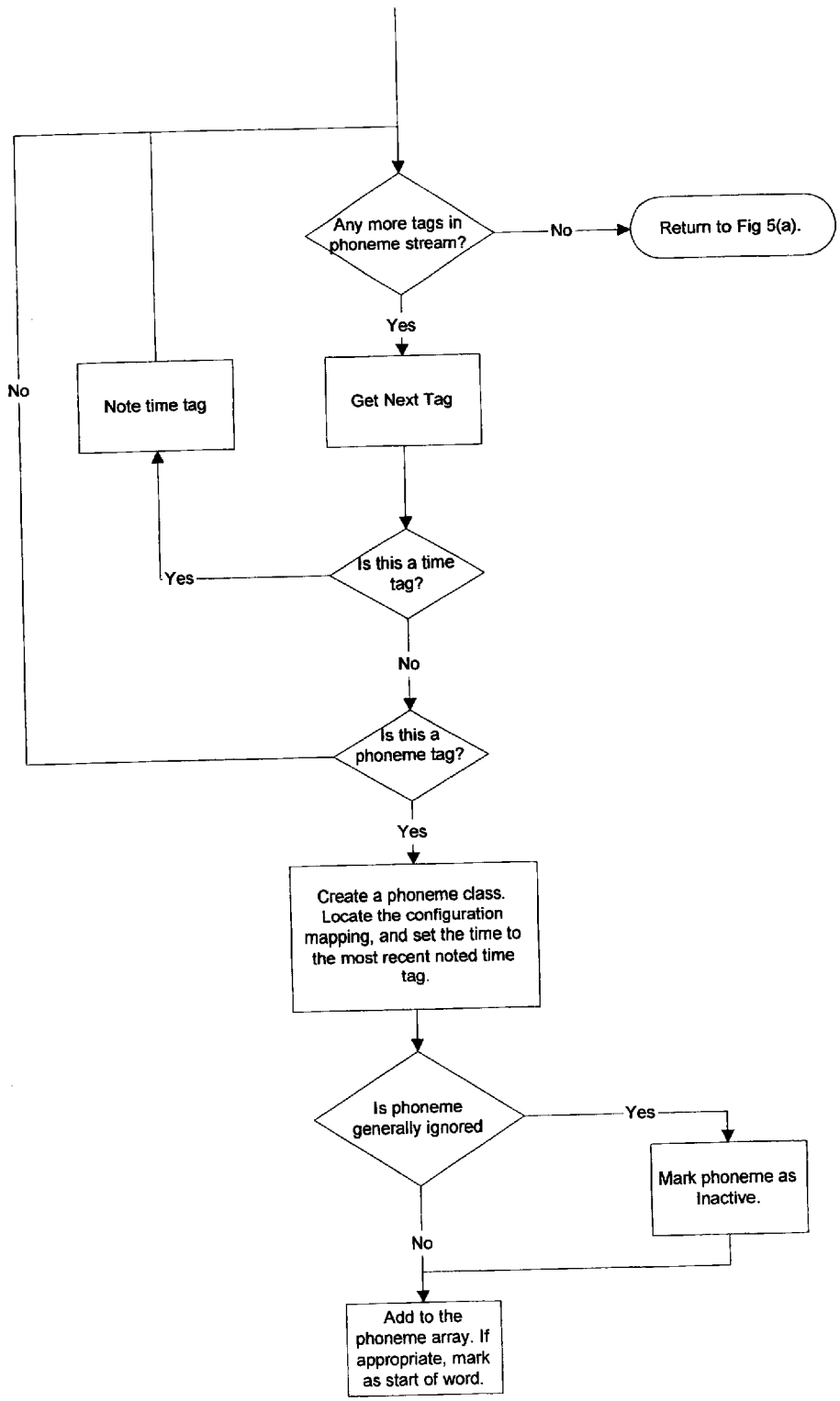

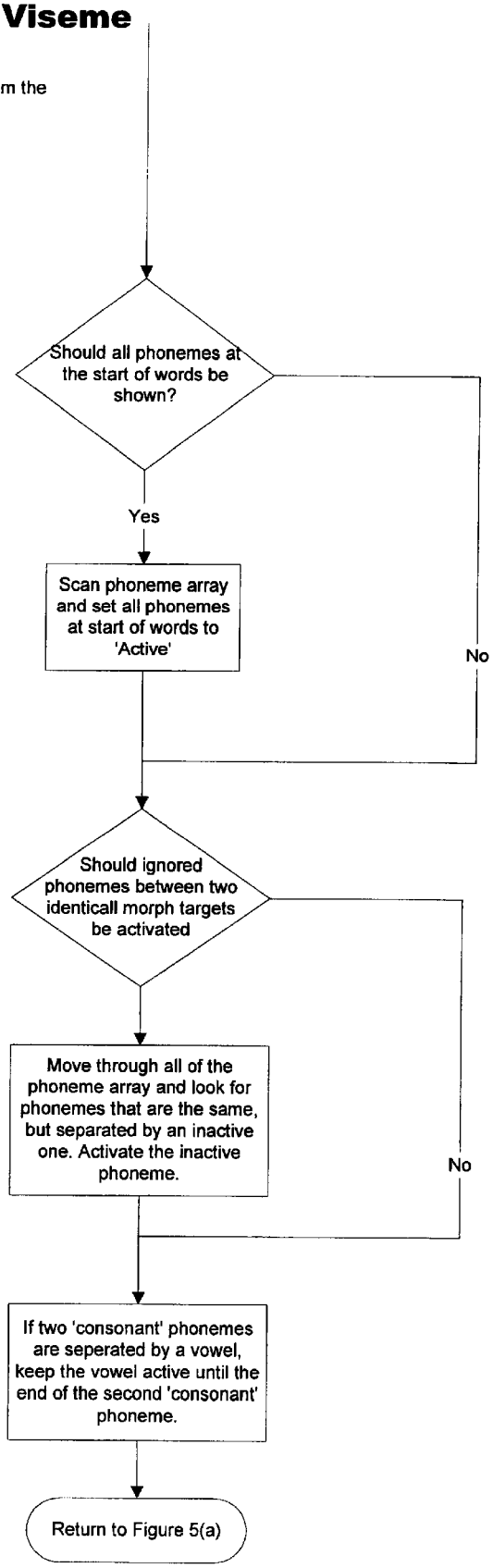
Figure 5(c) Phoneme to Viseme
Analyse the phoneme to morph-target mappings from the configuration file.

MORPH
TARGET D

MORPH
TARGET E

MORPH
TARGET G

MORPH
TARGET H

MORPH
TARGET J

Figure 8(a) Morph Player
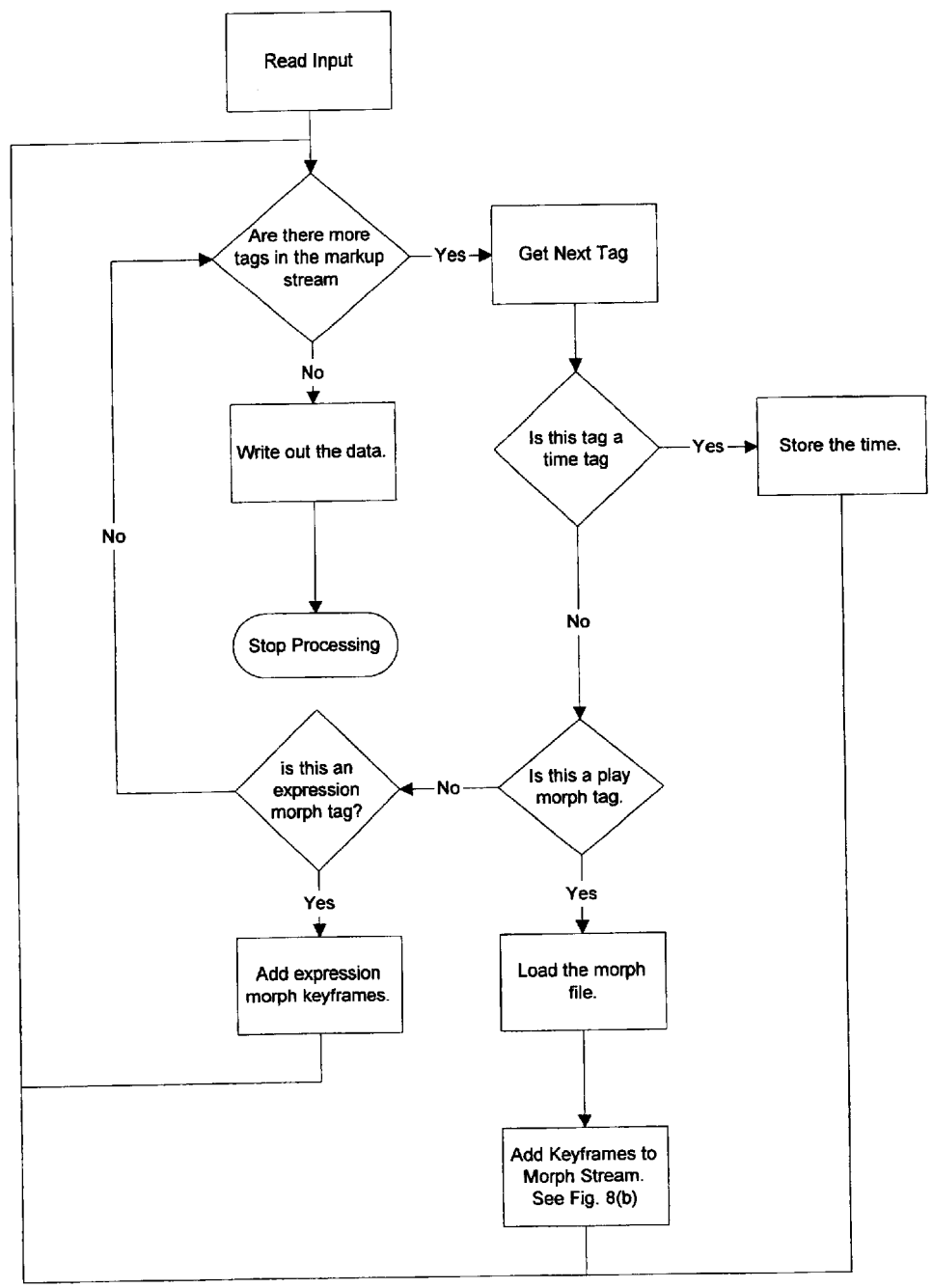

Figure 8(b) Morph Player
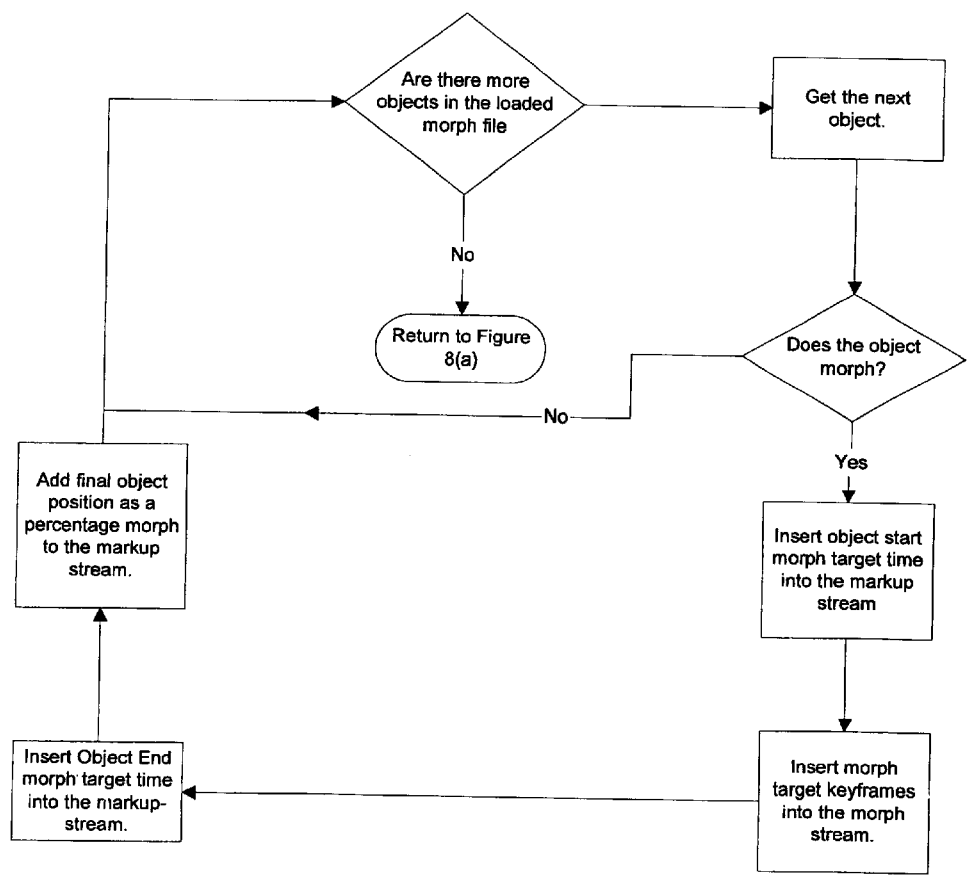

Animation Player - Figure 1.

Fig. 15 (+)

Fig. 15 (aa)

Fig. 15 (dd)

Fig 15 (ff)

Fig. 15 (99)

Fig. 15 (hh)

Fig 15 (ii)

Fig. 15 (oo)

Fig. 15 (99)

Fig. 15 (rr)

Fig. 15 (ss)

Fig. 15 (++)

Fig. 16 (1)

Fig. 16 (+)

Fig. 16e(2)

Fig. 16 (aa)

Fig 16 (bb)

Fig. 16 (cc)

Fig. 16c (ddd)

Fig. 16 (ee)

Fig. 16 (ff)

Fig- 16 (gg)

Fig 16 (11)

Fig. 16 (jj)

Fig. 16 (11)

Fig. 16 (mm)

Fig. 16 (nn)

Fig. 16 (oo)

Fig. 16 (pp)

Fig. 16 (gg)

Fig. 16 (rr)

Fig. 16 (ss)

Fig. 16 (++)

CHARACTER ANIMATION SYSTEM

CROSS REFERENCE TO RELATED APPLICATIONS

This application is related to the application Ser. No. 09/767,242 entitled "Interactive Virtual Assistant", submitted on the same date of Jan. 22, 2001. The disclosure of that application is fully incorporated by reference herein.

The present invention relates to character animation in image synthesis systems. In particular, though not exclusively, the invention relates to a method and system which operates in real-time to animate an image of a head of a character, including the character's face, so that the character appears to speak.

WO97/36288 describes an image synthesis method for synthesis of a moving picture of a face to accompany speech, for example synthetic speech. This method is based on three distinct steps being carried out, these being: (1) text-to-phoneme generation; (2) phoneme-to-viseme generation; (3) viseme-to-animation generation. In step (2), a viseme selected from a specific list is associated with each phoneme. To achieve a smooth transition the new phoneme comes on while the old one goes off, this process can take 100 or more milliseconds, and during this time both visemes are active. Additionally, in this method each animation frame is operated on by matching a single target face image to an adjusted wire frame, the wireframe being adjusted according to which visemes are required to represent desired phonemes.

It is an aim of the present invention to improve synchronization of lip movement to words being spoken, as well as incorporating facial expressions and/or head movements appropriate to the speech into the animated face, so as to closely simulate a human face speaking.

According to a first aspect of the present invention we provide a method of generating an animated image of at least a head of a character which is speaking, the character's face having visible articulation matching words being spoken, the method comprising:

(a) processing an input stream of marked up text comprising text to be spoken by an animated character and a plurality of mark up instructions representing behavioural features to be implemented in the animated character, so as to replace recognisable ones of said mark up instructions with predefined modified mark up instructions, so as to convert said input stream of marked up text into a modified output stream of marked up text;

(b) processing said modified output stream of marked up text using randomising means so as to insert additional randomly selected mark up instructions into said modified output stream of marked up text, said randomly selected mark up instructions representing random behavioural features to be implemented in the animated character;

(c) processing said modified output stream of marked up text, with said additional randomly inserted mark-up instructions inserted therein, so as to produce: an audio signal stream for use in generating an audio signal representing said text being spoken; a phoneme signal stream representing a sequence of phonemes corresponding to successive portions of the audio signal; and a mark up instruction stream comprising mark up instructions for use in other processing phases of the method;

(d) processing said phoneme stream using phoneme-to-viseme mapping means so as to produce a morph target stream representing a series of morph targets, where a morph target comprises a predefined shape of the head of the character, wherein each said morph target in the series comprises a viseme, where a viseme comprises a predefined shape of the face containing a mouth of the character in a predetermined mouth shape matching a said phoneme;

(e) modifying said morph target stream using mark-up instructions contained in said mark-up instruction stream so as to produce a modified morph target stream representing a modified series of morph targets comprising said series of visemes having at least one further morph target inserted therein;

(f) processing said modified morph target stream, and said mark-up instruction stream, so as to generate an animated image of at least the character's head, said animated image comprising a sequence of image frames including image frames showing the character's face in said predefined shapes corresponding to the morph targets in said modified morph target stream; and (g) displaying said animated image on a display means synchronously with generating said audio signal from said audio signal stream so that the animated character appears to speak, the movement of the mouth portion of the character's face matching the phonemes in the audio signal.

In one preferred embodiment, the method operates in real-time in the sense that said animated image of the character speaking audible words is generated on-the-fly from said second stream of marked up text, the image frames of the animated image being generated at a rate of at least 15 frames per second, most preferably at least 25 frames per second.

The modified mark up instructions which replace the recognisable mark up instructions in the first stream of marked up text, in step (a) of the method, comprise "expanded" mark up instructions which are specified by templates or "macros" stored in a memory means of a computer system means in which the method is implemented, with which templates said mark up instructions in said first stream of marked up text are compared (in step (a)).

Each morph target comprises a three-dimensional model mesh of a head of a character, including all the facial features of the character. Where the morph target is a viseme, these facial features include said mouth portion in a predetermined mouth shape. Each morph target viseme may comprise an image of only a portion of a head or face of the character which portion, in the case of a viseme, includes said mouth portion in a predetermined mouth shape.

The predetermined mouth shape of the mouth portion in each viseme is preferably unique to that viseme.

Conveniently a further morph target is inserted into the series of visemes is a morph target in which the face has a predefined facial expression, such as a smile or a frown or is otherwise configured to provide additional expression in the final animated face. More than one further morph target is inserted, for example a sequence of morph targets is inserted so as to add more complicated additional expression to the face. For example an additional sequence of morph targets, including visemes, may be inserted to add particular words or phrases to the character's speech, for example such as making the character say goodbye, where several expressions are combined in a short timed image sequence. The visemes in the original series of visemes may therefore relate to image frames which are more than one image frame apart in the final animation.

The method advantageously further includes inserting additional randomly selected morph targets into said modified series of morph targets, said additional morph targets providing random movements/expressions in the animated face to add authenticity to the face, for example where the character is a human being such randomly selected additional morph targets help to make the animated face more closely resemble a human being speaking. The images represented by said additional morph targets may, for example, show the eyes blinking or the head moving slightly from side to side or the face effecting a nervous twitch.

In step (d) of the method, preferably each phoneme represented in said phoneme stream is mapped to a respective viseme. However, at least one, of said phonemes and the respective visemes allocated therefor are then removed so that these visemes are not included in said first series of visemes, or said modified series of visemes. The phoneme(s) which are removed are those deemed unnecessary in order to sufficiently synchronize the mouth/lip movement of the final animated face to the text being spoken. Predetermined criteria are used to assess whether any particular phoneme and its respective viseme are unnecessary and should therefore be removed. Removal of unnecessary phonemes in this manner has the advantage of performing a smoothing action on the series of visemes such that the mouth in the final animated face will move with less discontinuity, in a more authentic fashion. Without this feature the mouth would be seen to "pop" about a lot.

Preferably step (f) of the method includes processing said mark-up instruction stream so as to generate an animation stream comprising animation instructions for generating at least one predetermined animation. For the avoidance of doubt, in the context of the present invention an animation is a sequence of changes in an image, showing what appears to be a movement in an object or objects. The animation instructions in the generated animation stream comprise one or more pregenerated sets of keyframes. A keyframe is a value or set of values that defines the position or shape of models of the said object(s). Preferably the animation instructions comprise sequences of positional keyframes defining gross head and body movement of the character having the animated face, relative to the space in which the character is located.

In a similar fashion to the way in which random facial movement and expression can be added to the animated image by adding randomly selected morph targets to the modified morph target series, the method may include introducing random animations to the animated image by adding to the animation stream additional, randomly selected, animation instructions for generating random movement in the animated character, for example random head or body movements.

Step (f) preferably further includes processing the modified morph target stream so as to animate or "morph" each morph target therein. It will be appreciated that each morph target comprises a set of predetermined keyframes ("morph target keyframes") whereby each morph target can be animated individually. Step (f) advantageously further includes interpolating positions between morph target keyframes specified by the modified morph target stream so as to achieve smooth and realistic mouth movement in the character's face in the final animated image. Preferably, step (f) also includes interpolating between the positional keyframes in the animation stream so as to achieve smooth motion in the final animated image, for example smooth face, head and body movement in the animated character.

The interpolation between keyframes may be carried out using one or more suitable smoothing processes to remove or reduce any discontinuities in the animated image. In the present invention, the preferred interpolation technique is to use spline-based smoothing techniques, particularly using hermite splines. This is particularly effective in simulating authentic human motion.

Steps (f) and (g) of the method include processing said modified morph target stream, said animation stream, said audio signal stream, and said mark-up instruction stream using renderer means to which generate and display, on a display means, the animated image, based on predefined data describing a scene to be animated, said animated image being synchronized to the audio signal which the renderer also generates from the audio signal stream.

According to another aspect of the invention there is provided a system for generating an animated image of at least a head of a character which is speaking, the character's face having visible articulation matching words being spoken, the system comprising:

a first processing module for processing a first stream of marked up text comprising text to be spoken by an animated character and a plurality of mark up instructions representing behavioural features to be implemented in the animated character, so as to convert said first stream of marked up text into a second, modified, stream of marked up text by replacing recognisable ones of said mark up instructions in said first stream with predefined modified mark up instructions, wherein said first processing module includes mark up instruction recognition means comprising comparing means for comparing mark up instructions in said first stream with predetermined mark up instructions stored in a memory means accessible to the system;

a second processing module comprising randomiser means for processing said second stream of marked up text so as to insert randomly selected mark up instructions into said second stream of marked up text, said randomly selected mark up instruction representing random behavioural features to be implemented in the animated character;

a third processing module comprising text-to-speech converter means for processing said second stream of marked up text so as to produce: an audio signal stream for use in generating an audio signal representing said text being spoken; a phoneme stream representing a sequence of phonemes corresponding to successive portions of the audio signal; and a mark up instruction stream comprising mark up instructions for use in other processing modules of the system;

a fourth processing module comprising phoneme-to-viseme mapping means for processing said phoneme stream so as to produce a morph target stream representing a series of morph targets, where a morph target comprises a predefined shape of at least a portion of the face of the character, wherein each said morph target in the series comprises a viseme, where a viseme comprises a predefined shape of at least a mouth portion of the face containing a mouth of the character in a predetermined mouth shape matching a said phoneme;

a fifth processing module comprising morph target insertion means for modifying said morph target stream, using mark up instructions contained in said mark up instruction stream, so as to produce a modified morph target stream representing a modified series of morph targets comprising at least one further morph target inserted therein; and a sixth processing module comprising rendering means for processing said modified morph target stream and said mark up instruction stream, so as to generate an animated image of at least the character's head, said animated image comprising a sequence of image frames including image frames showing the character's face in said predefined shapes corresponding to the morph targets in said modified morph target stream; and for displaying, on a display means accessible to the system in use thereof, said animated image synchronously with generating the audio signal from said audio signal stream so that the character appears to speak, the movement of the mouth portion of the face matching the phonemes in the audio signal.

The first stream of marked up text iterates through the first processing module a number of times, being further modified after each pass, before producing the second, modified stream of marked up text.

The six processing modules are incorporated in a framework means of the system. Each said module has interface means via which said module is interfaced with a respective complementary interface means provided in said framework means. Preferably, said framework means is configured to control all transfers of data signals from any one said module to another said module and to ensure that all such transfers take place via said framework means. The framework means is configured to control the operation of the system such that each said processing module is operated in turn.

The phonemes in said phoneme stream are time-marked such that the phoneme stream includes timing information for each phoneme in the phoneme stream, said timing information identifying the length of each phoneme (in the final audio signal). The morph targets in said modified morph target stream are similarly time-marked. The mark up instruction stream includes timing data for specifying the correct times at which morph targets and animation instructions are to be inserted into the morph target stream and animation stream respectively. Thus, each tag in the mark up instruction stream is preferably marked as occurring at a particular time at which the event specified in the tag will take place in the final animation.

It will be appreciated that the above system, including all said processing modules thereof, can be implemented entirely in software. The software may be distributed as a computer program product, for example, or may be provided as firmware in a hardware-based system.

Thus, according to another aspect of the present invention there is provided a computer program product comprising:

a computer usable medium having computer readable code means embodied in said medium for generating an animated image of at least the head of a character which is speaking, the character's face having visible articulation matching words being spoken, said computer readable code means comprising:

program code for processing a first stream of marked up text comprising text to be spoken by an animated character and a plurality of mark up instructions representing behavioural features to be implemented in the animated character, so as to replace recognisable ones of said mark up instructions with predefined modified mark up instructions, so as to convert said first stream of marked up text into a second, modified, stream of marked up text;

program code for processing said second stream of marked up text using randomising means so as to insert additional randomly selected mark up instructions into said second stream of marked up text, said randomly selected mark up instructions representing random behavioral features to be implemented in the animated character;

program code for processing said second stream of marked up text so as to produce: an audio signal stream for generating an audio signal representing said text being spoken; a phoneme stream comprising a sequence of phonemes corresponding to successive portions of the audio signal; and a mark up instruction stream comprising mark up instructions for use in other processing phases of the method;

program code for processing said phoneme stream using phoneme-to-viseme mapping means so as to produce a morph target stream representing a series of morph targets, where a morph target comprises a predefined shape of at least a portion of the face of the character, wherein each said morph target in the series comprises a viseme, where a viseme comprises a predefined shape of at least a mouth portion of the face containing a mouth of the character in a predetermined mouth shape matching a said phoneme;

program code for modifying said morph target stream using mark-up instructions contained in said mark-up instruction stream so as to produce a modified morph target stream representing a modified series of morph targets comprising said series of visemes having at least one further morph target inserted therein; and program code for: processing said modified morph target stream, using mark-up instructions contained in said mark-up instruction stream, so as to generate an animated image of at least the head of the character, said animated image comprising a sequence of image frames including image frames showing the character's face in said predefined shapes corresponding to the morph targets in the modified morph target stream; and displaying said animated image on a display means synchronously with generating said audio signal from said audio signal stream so that the character appears to speak, the movement of the mouth portion of the face matching the phonemes in the audio signal.

Preferred embodiments of the invention will now be described by way of example only and with reference to the accompanying drawings in which:

FIG. 2 is a flow diagram illustrating the processing steps carried out by a Macro-Expander module of the system of FIG. 1;

FIG. 3 is a flow diagram illustrating the processing steps carried out by a Random Inserter module of the system of FIG. 1;

FIG. 4 is a flow diagram illustrating the processing steps carried out by a Text-to-Speech Converter module of the system of FIG. 1;

FIG. 5(a) is a flow diagram overview of a Phoneme-to-Viseme Mapper module of the system of FIG. 1;

FIG. 5(b) is a first flow diagram illustrating processing steps carried out by the Phoneme-to-Viseme Mapper module of FIG. 5(a);

FIG. 5(c) is a further flow diagram illustrating further processing steps carried out by the Phoneme-to-Viseme Mapper module of the system of FIG. 5(a);

Figure 1:
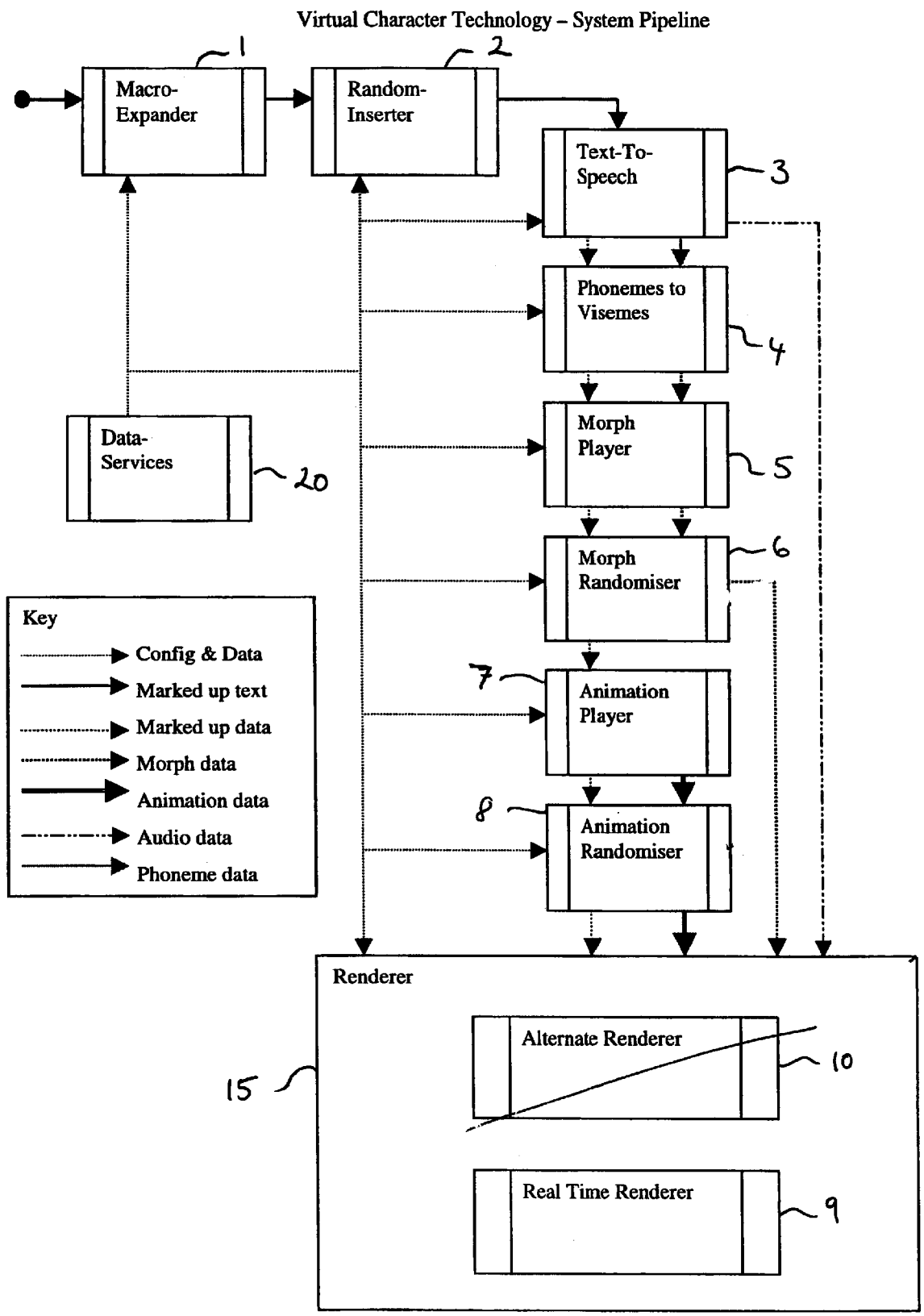
FIG. 1 is a flow chart illustrating the data flow in a real-time character animation system according to an embodiment of the invention.
Figure 6A:
Figure 6B:
Figure 6C:
Figure 6D:
Figure 6E:
Figure 7A:
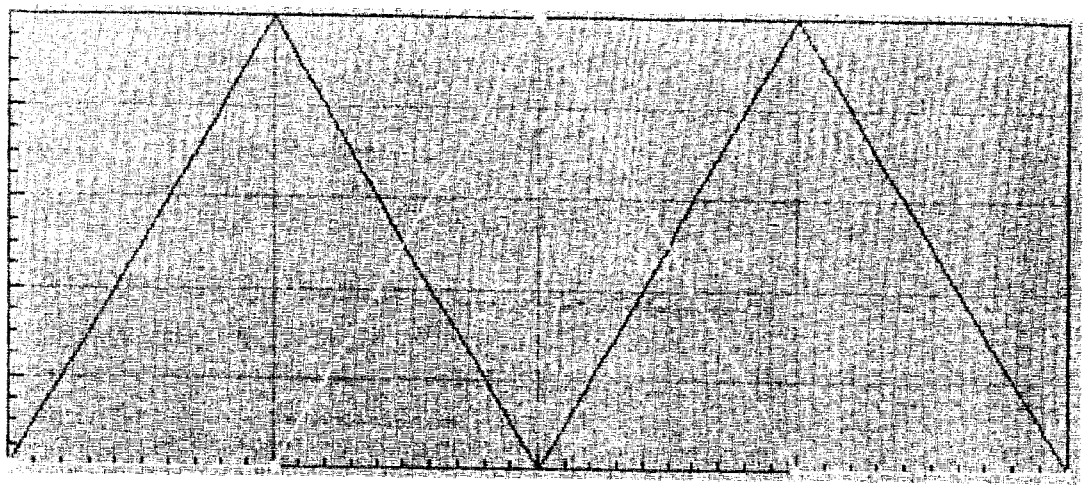
Figure 7B:
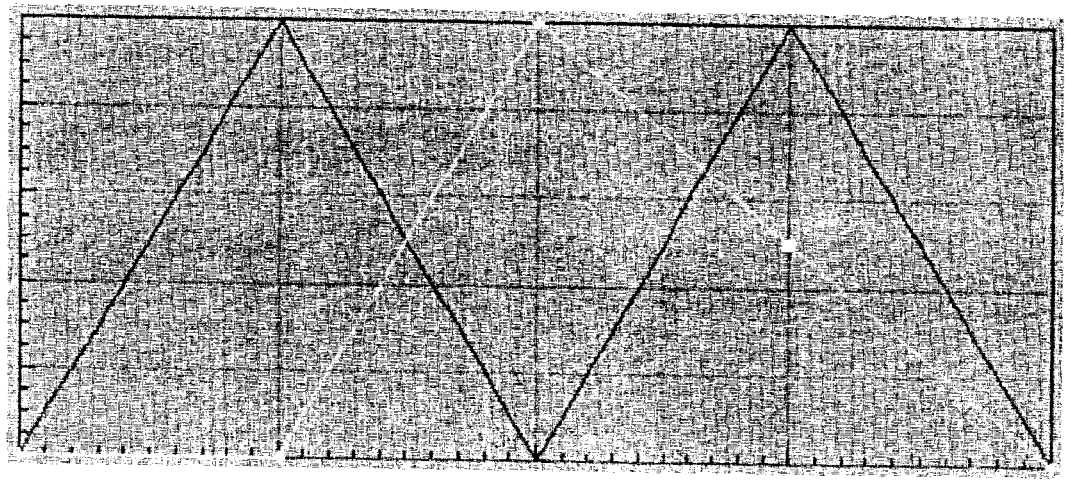
Figure 9A:
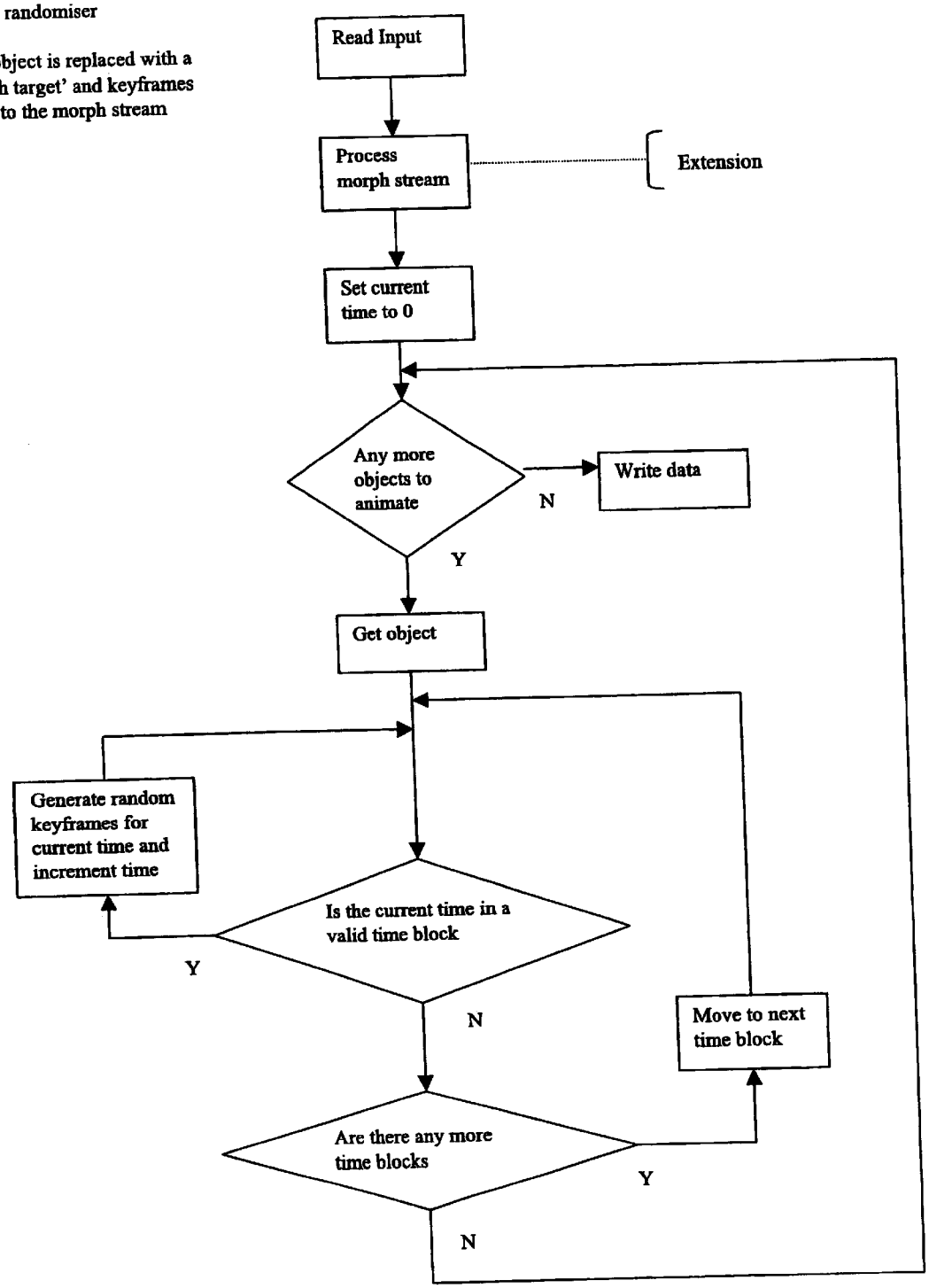
Figure 9B:
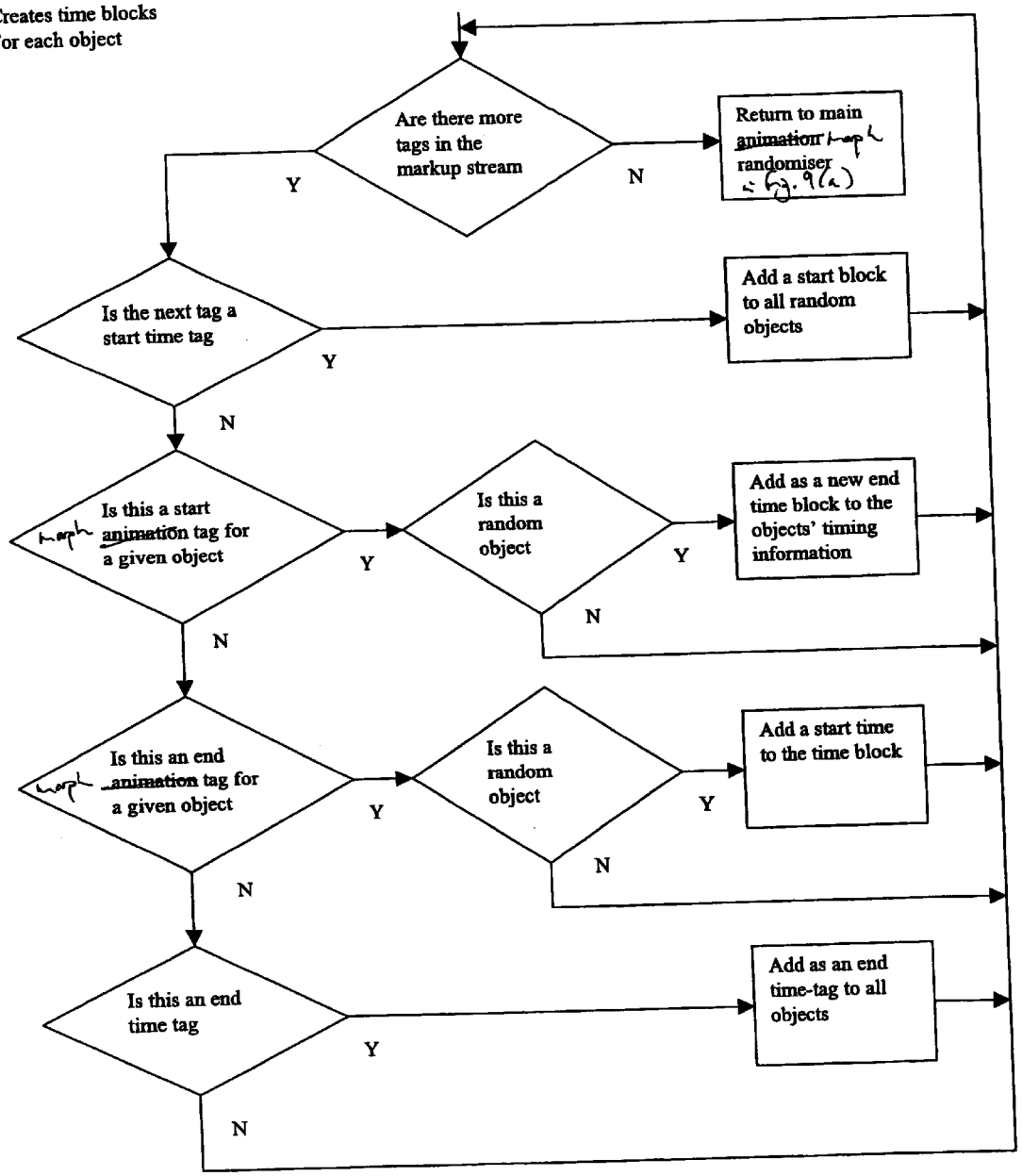
Figure 10A:
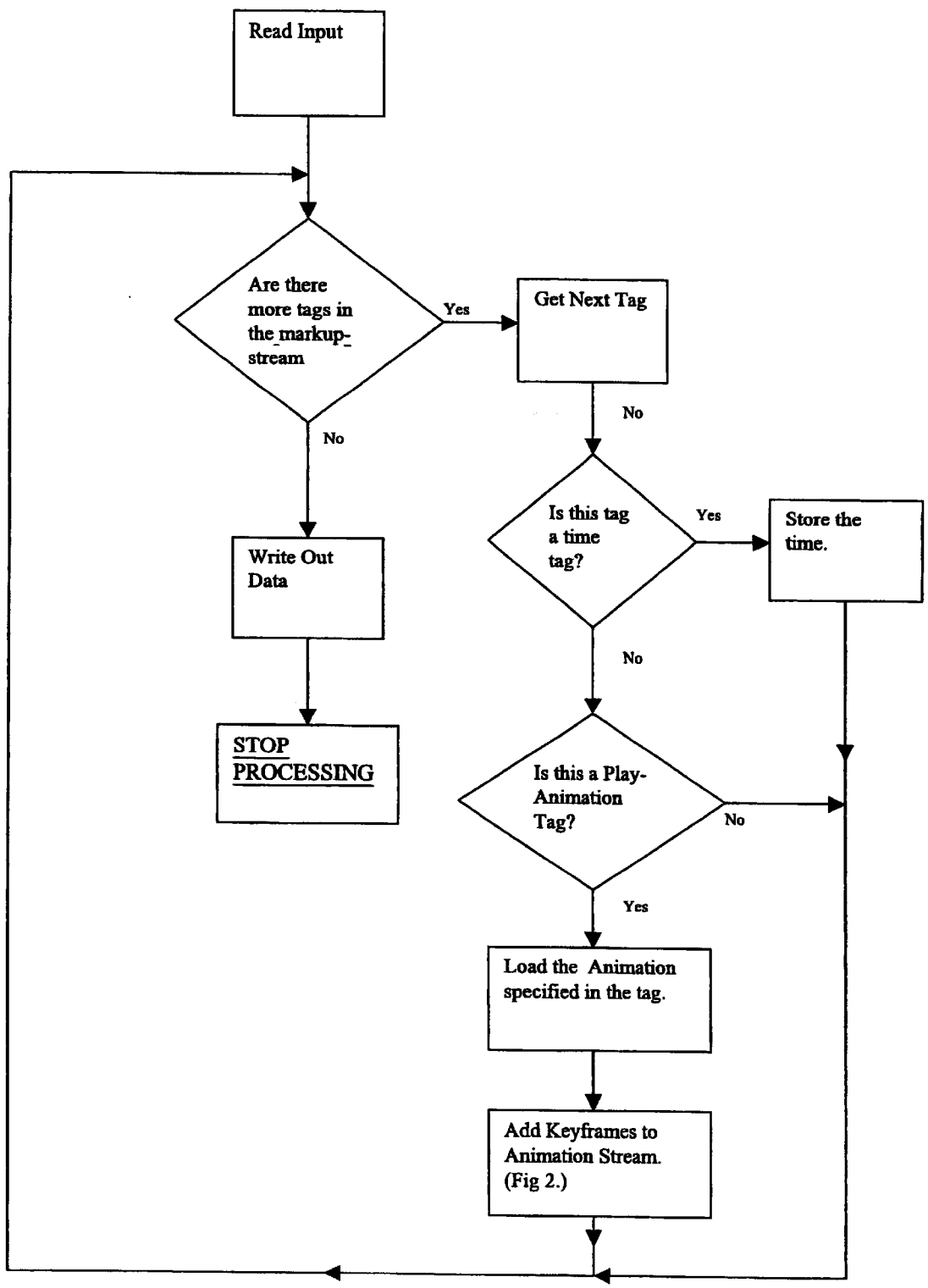
Figure 10B:
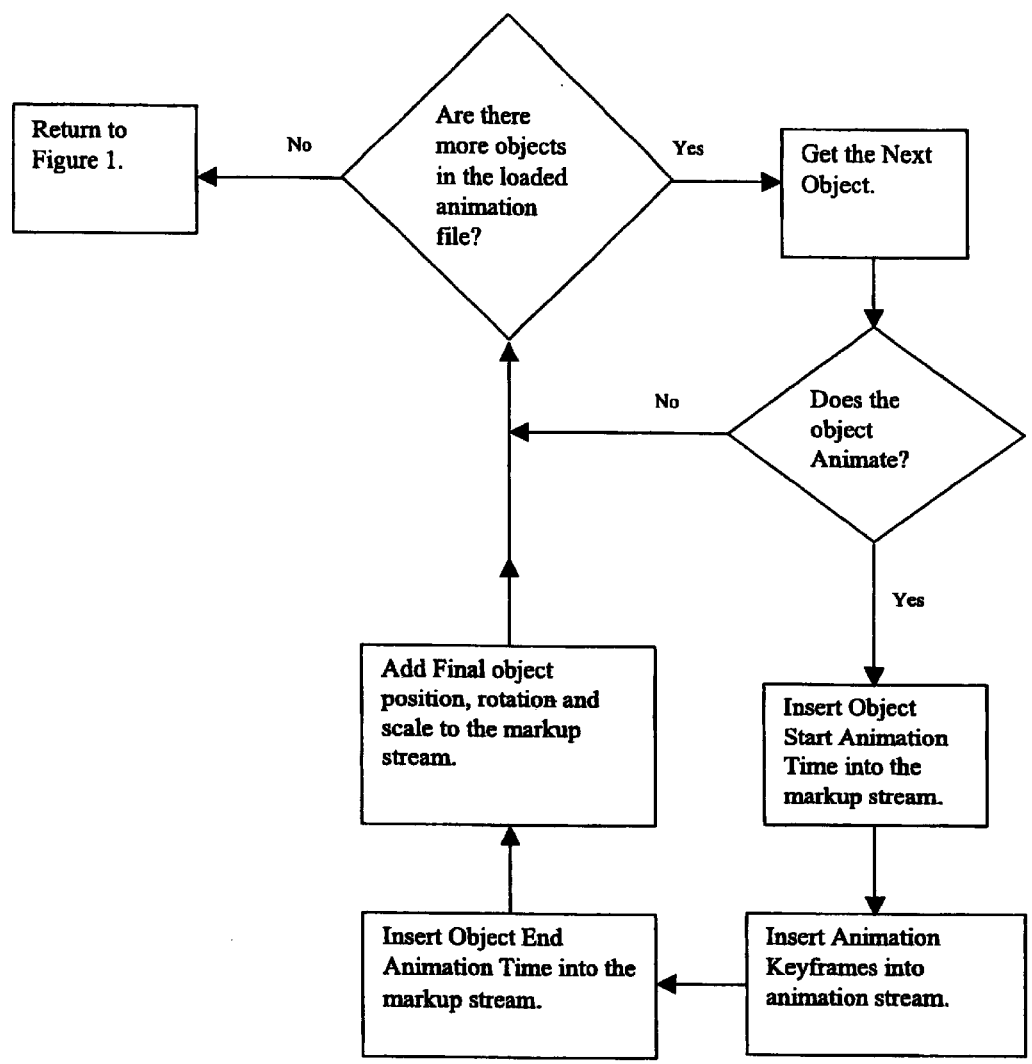
Figure 11A:
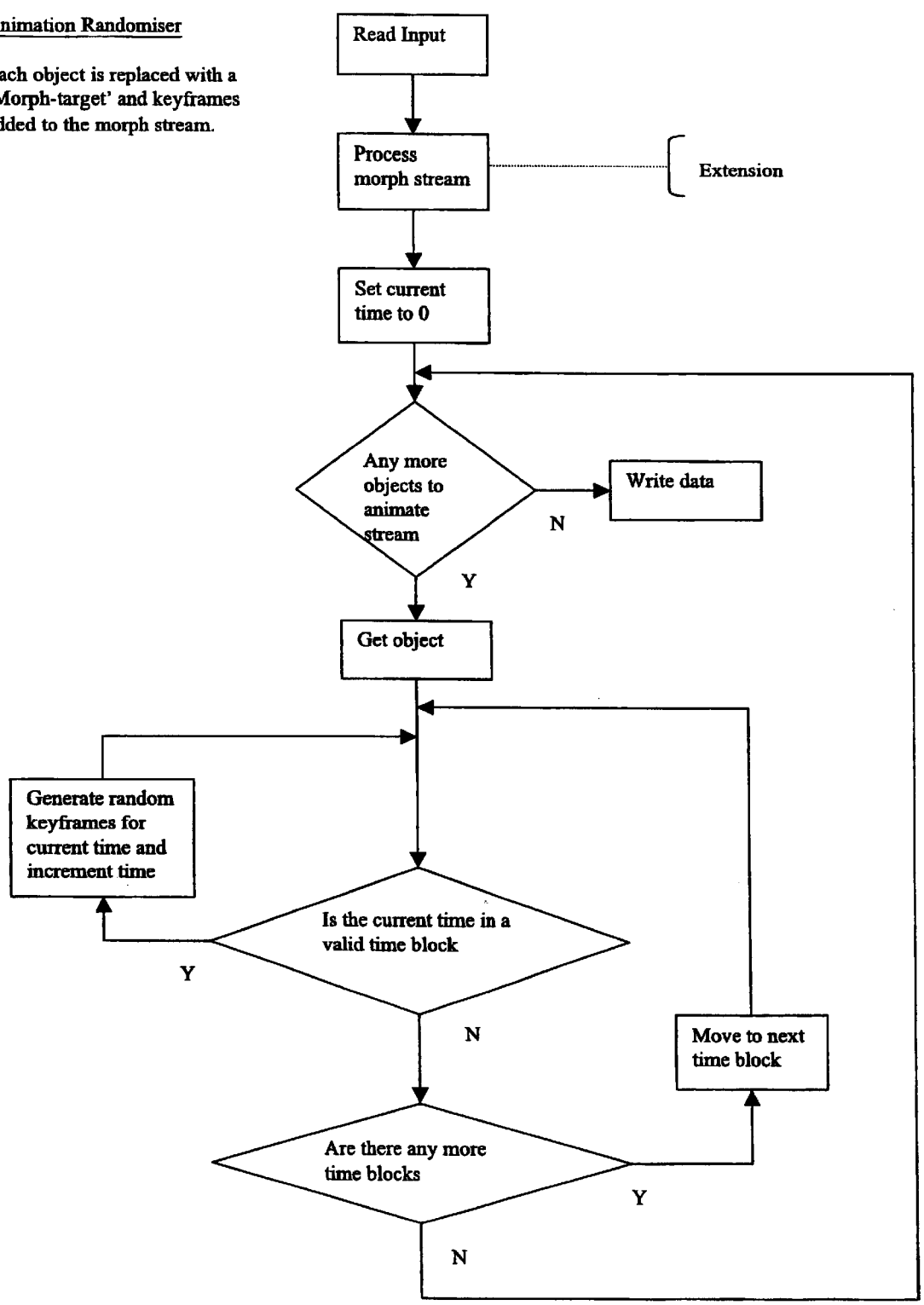
Figure 11B:
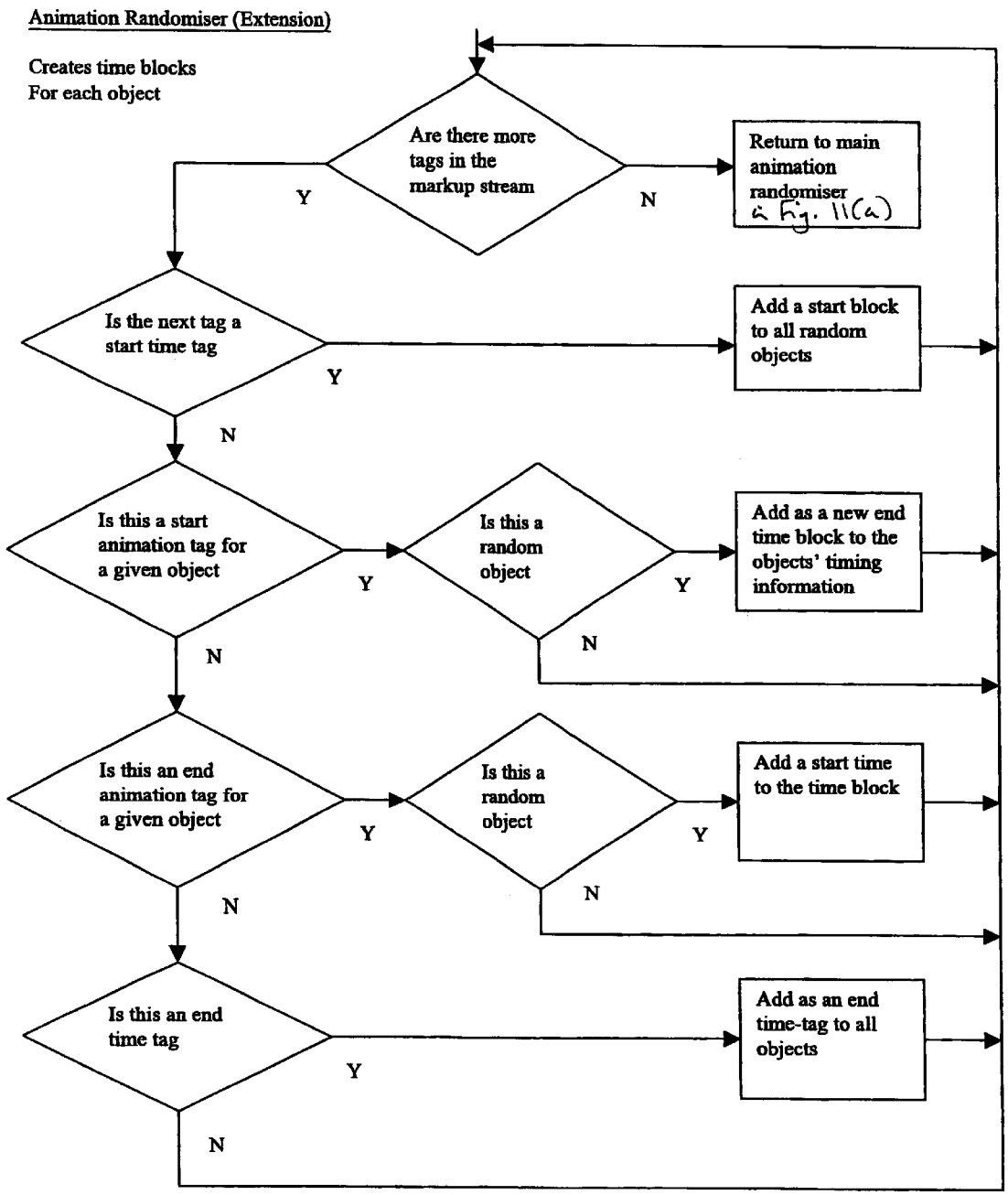
Figure 12:
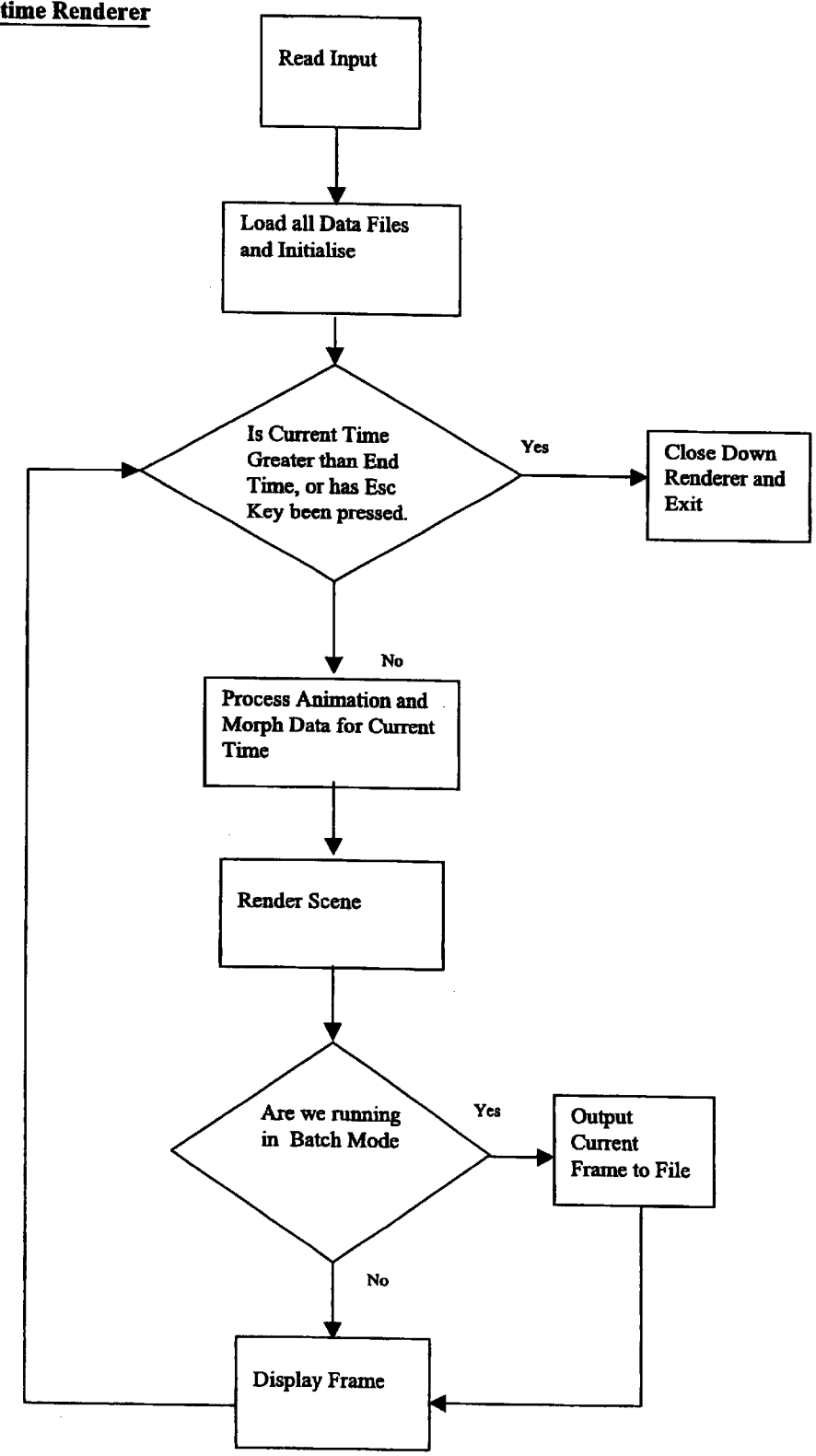
Figure 13A:
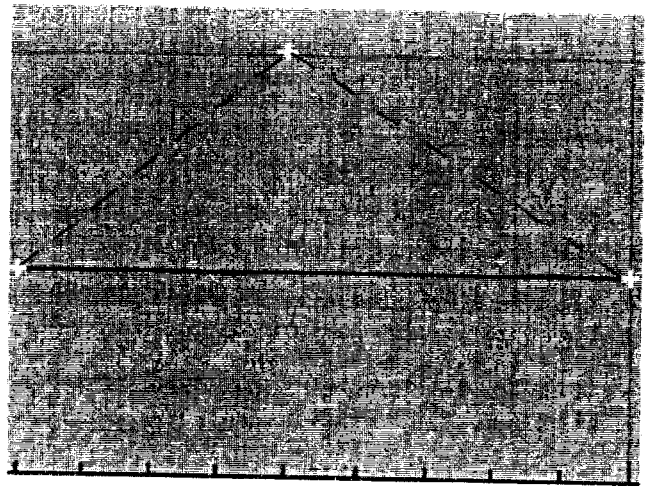
Figure 14:
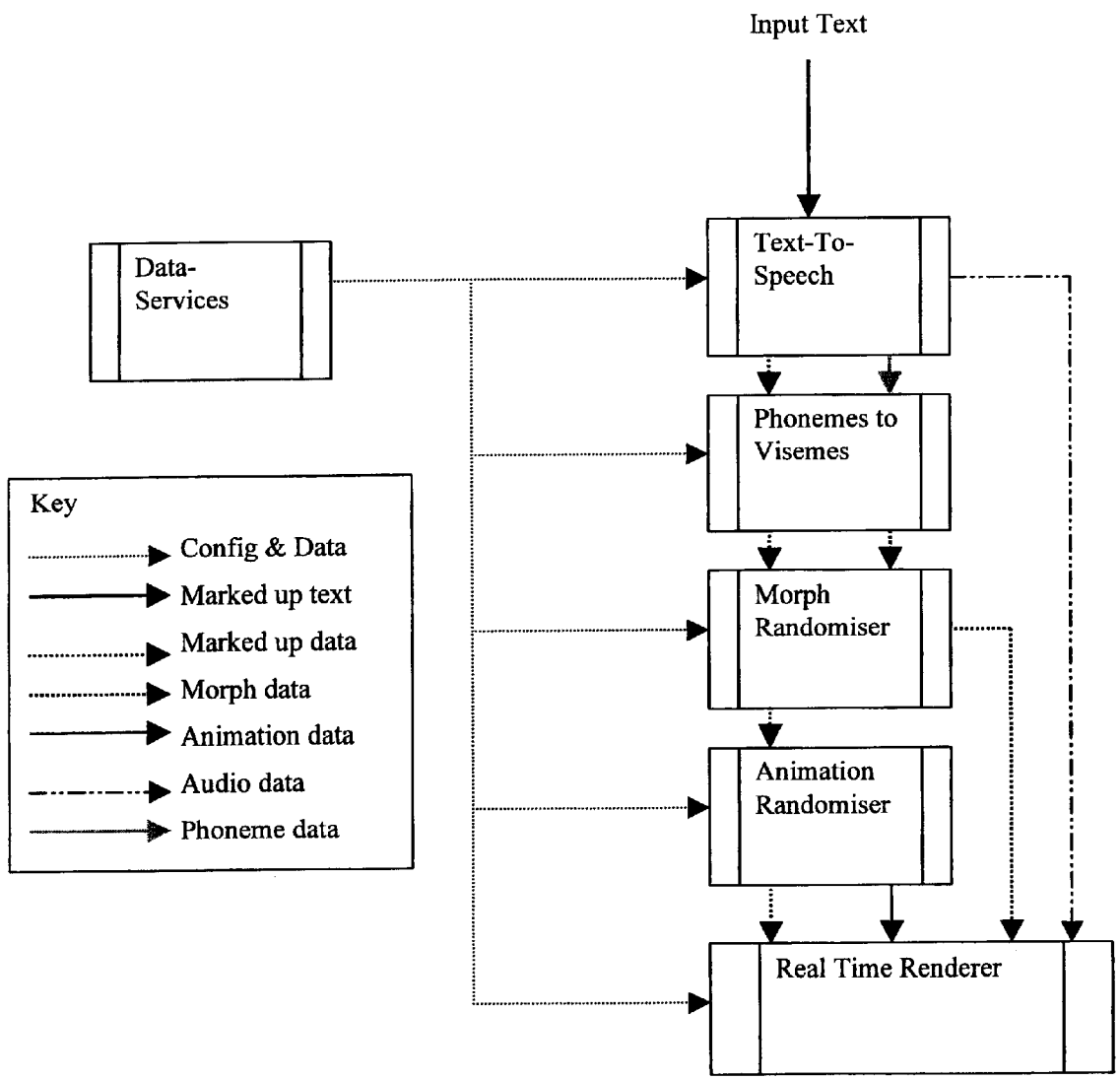

FIGS. 6(a) to (e) illustrate respectively, in two-dimensional picture form, five different visemes;

FIG. 7(a) illustrates graphically normal activation status of a vowel between two consonants in a phoneme stream;

FIG. 7(b) illustrates graphically modified activation of a vowel of between two consonants, so as to smooth the transition;

FIG. 8(a) is a first flow diagram illustrating processing steps carried out by a Morph Player module of FIG. 1;

FIG. 8(b) is a further flow diagram illustrating further processing steps carried out by the Morph player module of FIG. 1;

FIG. 9(a) is a first flow diagram illustrating processing steps carried out by a Morph Randomiser module of FIG. 1;

FIG. 9(b) is a further flow diagram illustrating further processing steps carried out by the Morph Randomiser module of FIG. 1;

FIG. 10(a) is a first flow diagram illustrating processing steps carried out by an Animation Player module of FIG. 1;

FIG. 10(b) is a further flow diagram illustrating further processing steps carried out by the Animation Player module of FIG. 1;

FIG. 11(a) is a first flow diagram illustrating processing steps carried out by an Animation Randomiser module of FIG. 1;

FIG. 11(b) is a further flow diagram illustrating further processing steps carried out by the Animation Randomiser module of FIG. 1;

FIG. 12 is a flow diagram illustrating the processing steps carried out by a Real-time Renderer module of the system of FIG. 1;

FIGS. 13(a) and (b) are graphs illustrating interpolation between keyframes using linear and spline based motion smoothing techniques respectively, and FIG. 14 is a flow chart similar to FIG. 1 in accordance with an alternative embodiment of the invention for a minimum specification animation system.

Figure 15A:
Figure 15B:
Figure 15C:
Figure 15D:
Figure 15E:
Figure 15F:
Figure 15G:
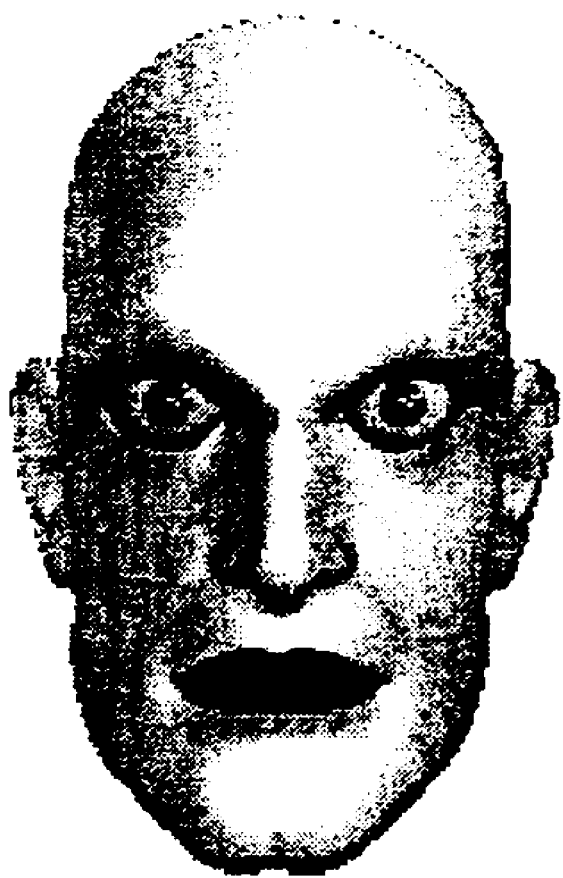
Figure 15H:
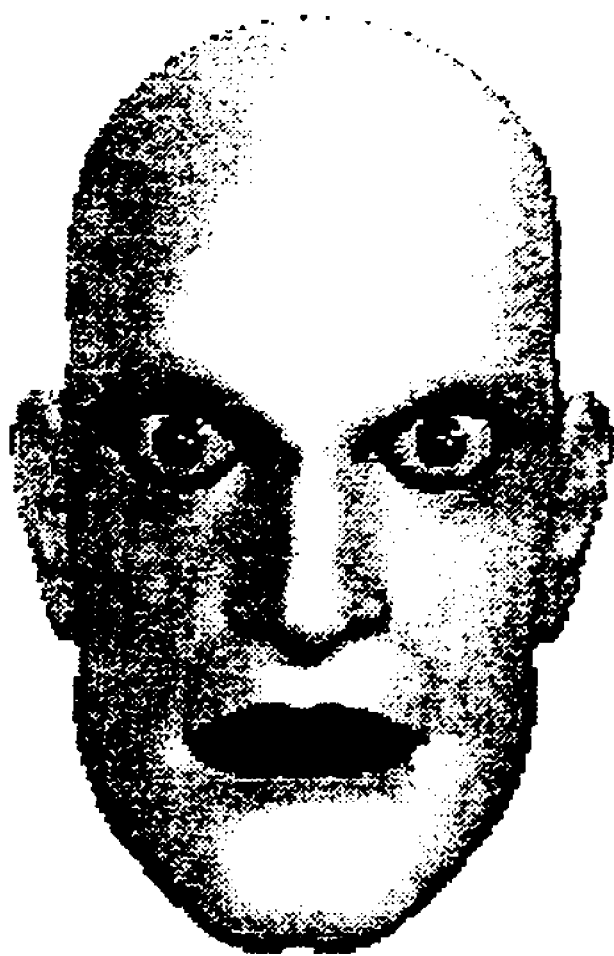
Figure 15I:
Figure 15J:
Figure 15K:
Figure 15:
Figure 15M:
Figure 15N:
Figure 15:
Figure 15:
Figure 15Q:
Figure 15:
Figure 15S:
Figure 15U:
Figure 15:
Figure 15W:
Figure 15:
Figure 15Y:
Figure 15:
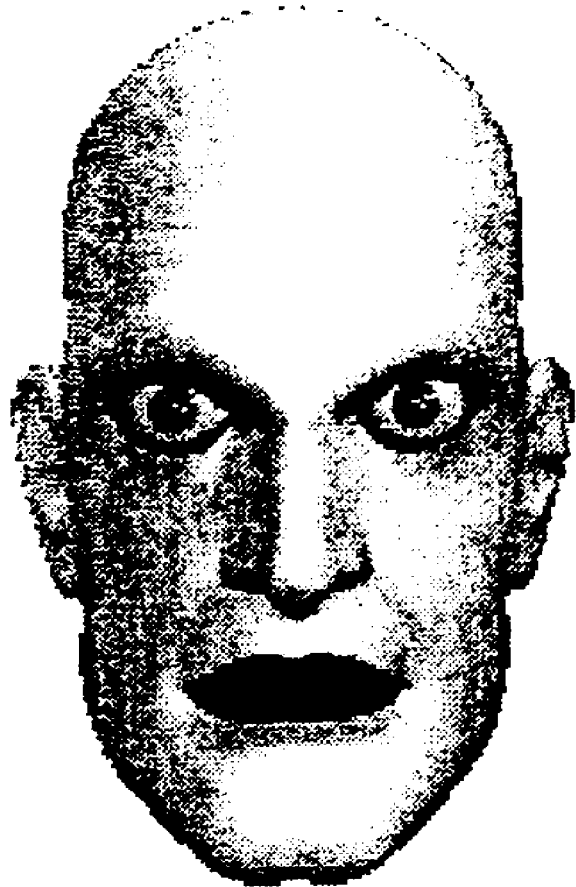
Figure 15:
Figure 15:
Figure 15:
Figure 15:
Figure 15:
Figure 15:
Figure 15:
Figure 15:
Figure 15:
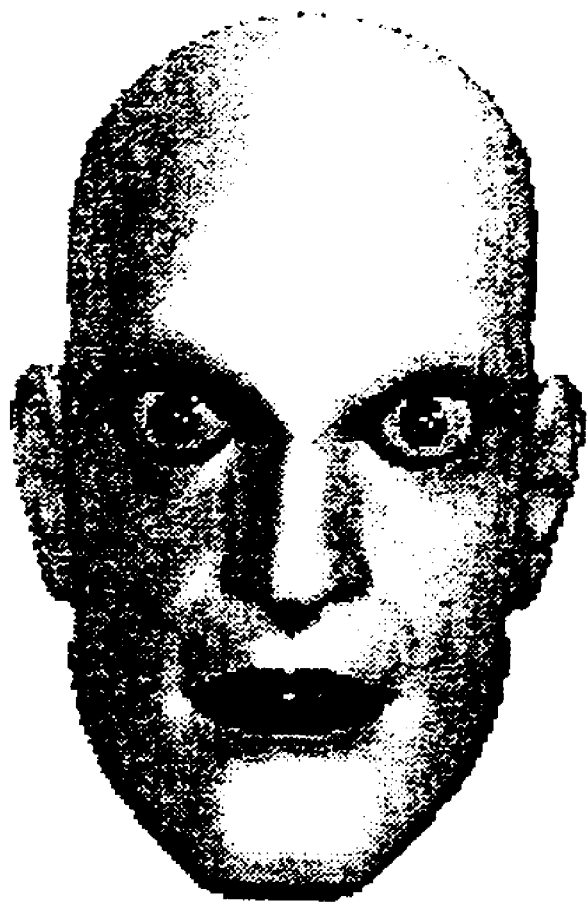
Figure 16:
Figure 16B:
Figure 16C:
Figure 16D:
Figure 16E:
Figure 16:
Figure 16G:
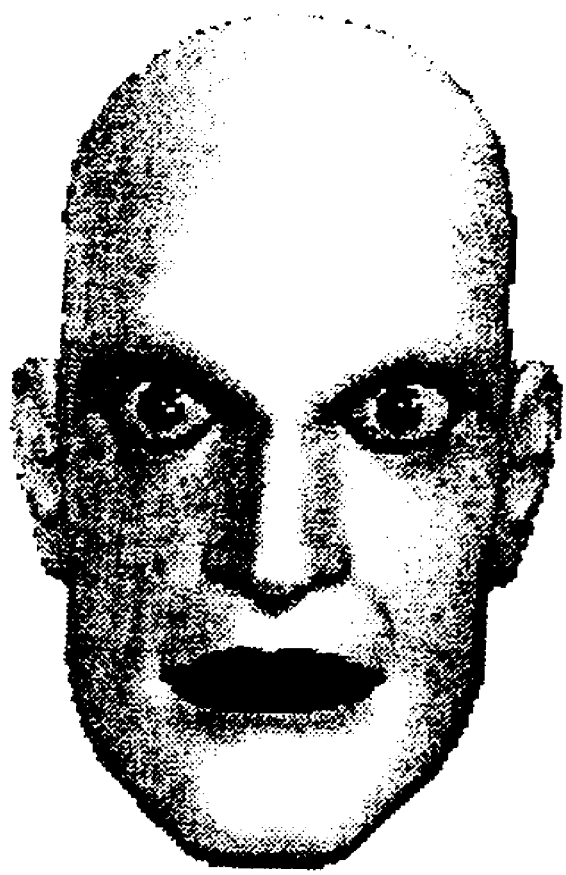
Figure 16H:
Figure 16:
Figure 16K:
Figure 16:
Figure 16M:
Figure 16N:
Figure 16C:
Figure 16:
Figure 16:
Figure 16:
Figure 16S:
Figure 16:
Figure 16V:
Figure 16W:
Figure 16X:
Figure 16:
Figure 16:
Figure 16:

FIGS. 15(a)–15(tt) together show a representative animation sequence of a character head, the animation not including morph or animation randomization; and FIGS. 16(a)–16(tt) together show an animation sequence of a character head corresponding to the animation sequence shown in FIGS. 15(a)–15(tt), but incorporating the product of the morph randomizer randomizer of the invention.

A preferred embodiment of the invention will be described in detail. The following is a glossary of terms which will be referred to in the description of the embodiment.

| Term | Description |
|---|---|
| Animation | A sequence of changes in an image (which is artificially generated, not recorded), affecting the positions of one or more objects, or parts of the object(s), in the image, resulting in what appears to be a movement of the objects(s) |
| Keyframe | A Keyframe is a value, or set of values, that defines the position or shape of a model at a point in time. Keyframes are inserted into animation streams, and the animation then moves from one keyframe to another by interpolating between the keyframes. The motion can be done in a linear fashion, or through splining. |
| Morph | Morphing is the process of moving one distinct shape to another (for example, a square to a circle and/or cube to sphere.) |

-continued

| Term | Description |
|---|---|
| | Where "morph" is used throughout the text, it usually refers to the process of morphing, or to a Morph Target. |
| Morph Target | A morph target is a predefined Target three-dimensional shape (hereinafter referred to as a "3D model") of an object. For example, the neutral (i.e. not speaking) head, and the head saying "o", are two separate morph targets. Visemes are a particular type of morph target, having face shapes that represent vocalised sounds. |
| PCM Data | This is audio data. PCM stands for Pulse Coded Modulation, and is one of the most common forms of storing audio data. |
| Stream | A stream is a sequence of tags. |
| Tags | A tag is a packet of information. This packet is stored in a computer's internal memory and therefore each packet requires a specific allocation of memory for it to be stored. Each tag is in coded form for internal use by the computer. However, the tags can also be presented in a human readable text format. |

The embodiment is best described in terms of a method for achieving real-time animation of an image of a human character (sometimes referred to as a "virtual character") uttering words, these words comprising predetermined text which the human character is to speak. It will be appreciated that in the preferred embodiment the method is in practice implemented as software which performs the various steps of the method. The primary characteristics of the method are:

1. Lip movement correctly synchronized to the words being spoken.
2. Facial expression appropriate to the text being spoken
3. Head, body and eyes moving in harmony with the speech.
4. The process operating in substantially real-time.

The system as a whole operates as a sequence of complementary subsystems (or "modules"). These are:

1. Macro-expander
2. Random Inserter
3. Text-to-speech Converter
4. Phoneme to Viseme Mapper
5. Morph Player
6. Morph Randomiser
7. Animation Player
8. Animation Randomiser
9. Real-time Renderer
10. Alternate Renderer We refer to the system as the Animated Character System. The entire system is managed by a controlling subsystem called the 'framework'. The framework's structure with regard to the sequence of subsystems is illustrated in FIG. 1. The individual subsystems are summarised below with a more detailed description of each subsystem following thereafter. The Text-to-speech Converter subsystem is implemented with a commercially available product, (Lernout-and-Hauspie RealSpeak (SDK)). The rest of the subsystems are unique to the present invention. The originality in the system lies in these unique subsystems and their integration into a working whole.

The whole Character Animation System (hereinafter referred to as the "CAS") is a program which is configurable through simple text based configuration files, and can be customised as required. The framework and each module are all individually configurable as a sub-file of the main configuration file. This main file is passed as a command line parameter of the whole program. A sample main configuration file is as shown immediately below:

Section FrameWork
Section PreProcessor
Section AnimationRandomiser
Section MorphRandomiser
Section LightwaveRenderer
Section PhonemeToViseme
Section TextToSpeech
Section MacroExpander
Section RealTimeRenderer
Section SearchPaths
[FrameWork]
;
; Include the framework data . . .
;
VerboseLogging On|Off
include IniFiles\FrameWork.ini
SwapPath W:\2203_PA\C:\DA\VAP\Run\Data\
[EndSection]
[PreProcessor]
include IniFiles\PreProcessor.ini
[EndSection]
[MacroExpander]
include IniFiles\MacroExpander.ini
[EndSection]
[RandomInserter]
include IniFiles\RandomInserter.ini
[EndSection]
[AnimationRandomiser]
;
; Include the randomiser data . . .
;
include IniFiles\AnimationRandomiser.ini
[EndSection]
[PhonemeToViseme]
;
; Include the phoneme to viseme initialisation data . . .
;
include IniFiles\PhonemeToViseme.ini
[EndSection]
[SearchPaths]
include IniFiles\SearchPaths.ini
[EndSection]
[LightwaveRenderer]
include IniFiles\LightwaveRenderer.ini
[EndSection]
[RealTimeRenderer]
include IniFiles\RealTimeRenderer.ini
[EndSection]
[TextToSpeech]
include IniFiles\TextToSpeech.ini
[EndSection]
[MorphRandomiser]
include IniFiles\MorphRandomiser.ini
[EndSection]

As can be seen from the above, the file is split into sections, each section has a number of parameters associated with it, and can either be entered directly, or included from another file. Including files can only be done within a valid section. Sections have to be named at the beginning of the file to be considered as valid.

With the current setup, the files are split up to keep the individual configuration options clear of one another, and to keep the files relatively small and manageable. One large configuration would quickly become unusable.

System Summary

Macro-expander

The macro-expander receives a stream of marked up text for which an animated image of a head of a character, in the present embodiment a human character, speaking the text is to be generated. (Other embodiments are possible in which the character is not human.) Facial expressions and head movements are specified with instructions or "tags" (coded inserts) in the text which "mark up" the raw text with behavioural cues. Different text sources may mark up the text with different sets of tags. The text itself is commonly also in the form of simple text tags representing the text to be spoken (the text itself is the "parameter" in the text tag). The 'Macro-expander' subsystem carries out the task of converting the input marked up text into a common set of specific instructions (tag instructions) which tell subsequent parts of the system precisely what to do to animate the marked up text. It does this by expanding mark up tags in the input marked up text with new tags in the form of sequences of code specified by tag templates or "macro definitions" (hereinafter referred to as "macros") which match the mark up tags and which are held in a configuration file stored in a memory of the computer system in which the Character Animation System is running. Only those tags in the input text which match stored macro definitions are expanded by the Macro-Expander. Tags which do not match are passed on through the Macro-Expander as they are.

The Macro-Expander also expands the simple text tags into new tag instructions. For example, a sentence of raw text (in the form of one or more simple text tags) is in effect bundled up in a new text instruction for the rest of the CAS. The output from the Macro-expander is thus a new set of tag instructions which are all the instructions required by the rest of the CAS in order to produce the desired animation.

Random Inserter

This subsystem inserts a random item of behavior into the marked up text stream output from the Macro-expander. This has the effect of varying the animated character's overall behaviour in delivering a segment of text. To ensure that the inserted behaviour is appropriate to the text, the original text will have been marked with a 'Random Insert' tag containing a list identifier. One or more lists of instruction tags for modifying the behaviour of the character are stored in respective configuration files in the computer memory. The Random-Inserter will select (at random) an item (or perhaps none at all) from the list corresponding to the list identifier in the Random Insert tag and add it to the instruction set (i.e. the stream of tags output from the Macro-expander).

Text-to-speech Converter

The Text-to-speech converter subsystem turns the pure text instructions into a wave file output for eventual verbalisation by the animated character, and to phoneme data for subsequent parts of the system. This subsystem uses a third-party text-to-speech engine (Lernout-and-Hauspie RealSpeak SDK). It is self-contained, and can therefore be replaced with another text-to-speech engine, if desired. The text-to-speech converter subsystem outputs an audio stream, a phoneme stream and a stream of marked up data comprising all the non-text tags which went in to the Random Inserter, plus timing tags which synchronise the audio to visual movement and expression (in the final animated character).

Phoneme to Viseme Mapper

The phoneme-to-viseme mapper receives the phoneme stream from the text-to-speech converter. The mapping is essentially a 1:1 correspondence between phonemes and visemes, but with some dispensable phonemes discarded, and a reduced set of visemes shared among the phonemes. Thus each phoneme is mapped to one viseme, but since the face shape for several phonemes can be identical, a single viseme is then used over a group of phonemes. As aforedescribed, the visemes, are 'morph targets', i.e. head models with pre-set face shapes. The phoneme-to-viseme mapper outputs a stream of morph target tags identifying the morph targets (the "morph stream")

Morph Player

This subsystem is responsible for adding additional expressions, and pre-canned sequences of expressions to the morph-stream generated by the phoneme to viseme mapper. The expression can be simple, such as making the character smile or frown when talking, or more complicated sequences of expressions, such as a goodbye, where several expressions may be combined in a short timed sequence. In general, morphing is used for the 'fine' movement of the facial expressions.

Morph Randomiser

This subsystem inserts random movements and expressions to add realism to the character and make it more convincing. This can be simple insertions like blinking or a nervous twitch, or just the slightest of movements achieved by nudging the motion controls of the morph face shape.

Animation Player

The Animation Player operates in a way similar to the morph player, but using pre-generated keyframe sets which are inserted directly into the animation stream, rather than into the morph stream. In the preferred embodiment described herebelow, these pre-generated keyframes are generally positional keyframes, used for the gross movement of the head and body (as opposed to the fine movement of the face itself).

Animation Randomiser

This serves the same purpose as the Morph Randomiser described above, but using pre-generated keyframe sequences inserted into the animation stream, rather than the morph stream, in order to insert random animations into the character, to make it more realistic. These random animations can be any random movement more "gross" than the "fine" movement of the facial expressions. For example such random animations may represent head emphasis and breathing.

Rendering Subsystem

The Rendering subsystem 15 takes the final output of the morph randomiser 6, animation randomiser 8 and text-to-speech 3 subsystems. The rendering subsystem comprises a default renderer which is a "real-time" renderer 9. This renders the animations on the fly, using OpenGL. It has options to save the animations as a Microsoft AVI file, a sequence of "targa" images, or just to display the pictures and sound on the screen. As part of the renderer, all of the motions are splined so that they are smooth, and there are no really sharp changes of direction.

As an alternative to the real-time renderer, a separate renderer 10 is also provided in the system. This separate renderer 10 allows the animations to be saved as a Lightwave scene file, for rendering within a Lightwave graphics package. ("Lightwave" is a commercial package for use by graphics artists to produce computer-generated images and animation, and is available from Newtek Inc., San Antonio, Tex. USA. Due to the modular nature of the system, renderers could be developed for all different types of graphics animation packages.

System Details

As noted above, the framework controls the entire system. It is responsible for creating each of the modules, connecting them together, processing them, and ensuring that data passes between them properly. The framework also has a helper module 20 that provides common services to all of the other modules: this helper module is called "DataServices". The common services provided by DataServices are general "housekeeping" services for all the modules, for example "file loading" and "error reporting".

Each of the modules used within the system has a small common interface (12 functions). This is all that is exposed to the framework, and the framework must work with only these functions. This common interface allows the DataServices module 20 to load these modules, and keep track of them in exactly the same way, regardless of the module type. The framework is designed so that modules can be loaded, and processed in any order, although for the present embodiment in order to generate the animated image it will be appreciated that it is necessary for certain modules to precede other modules. In particular, the text-to-speech converter must precede the Phoneme-to-Viseme Mapper. However, in the block diagram of FIG. 1, the animation player and animation randomiser could be interchanged with the morph player and morph randomiser respectively, without affecting the output animated image of the character.

Part of the interface exposed by each module is its input/output system which is comprised of input ports and output ports. These ports are created by the module upon start-up and are registered as having a given data type. When connecting the data ports the framework checks that the data ports are of compatible type. This is to ensure that the flowing data is always going somewhere sensible. (For the avoidance of doubt, the interfaces, input ports and output ports mentioned above are, in the preferred embodiment, implemented entirely in software rather than as physical hardware features.)

Once all of the modules have been loaded and connected, the system processes the modules in turn. The input marked up text stream is read from a file and written into the first module's input port (i.e. into the Macro-expander). Each module writes its output data to its output port, and this in turn is read by the next input module down stream in the signal processing chain of the framework.

It will be appreciated that as the input text stream flows through the system and is processed by each module in turn it is altered and/or augmented by each module in turn. The data leaving the final module's output ports (the Renderer's output ports) can be written to disk if required. This data is the final animation, which can be saved for example as a Microsoft AVI file, as above-described.

The power of the framework is in its ability to connect and route the data through the modules guided by a simple configuration file. This power is of great use in expandability; new modules can be created and added just by changing the framework configuration file. New modules could, for example, perform video sequence inserts and/or true-physics-guided motion.

A detailed description of each of the subsystems is now provided, with reference to FIG. 1 and corresponding flow diagrams illustrating each subsystem. FIG. 1 also contains a 'key' or legend to explain that different visual depictions of data paths refer to different types of data present at certain stages in the process of generating the animated image.

Macro-expander

The Macro-expander 1 replaces tags in the original marked up text stream that match stored tag templates (also called macros) stored in a memory means of the computer system in which the Character Animation System is running, with one or more new or "expanded" tag instructions defined by the respective said stored tag template or "macro definition". The macro-expander configuration file can store any number of separate groups of tag-templates. Groups are specified within the configuration file according to the needs of the system. Using multiple groups provides the same effect as having multiple macro-expander modules, each of which is limited to a single group. On initialisation, the Macro-expander reads a configuration file, which describes the tag templates, including how they should be modified to incorporate parameters which may be present in the recognised tags. Starting with a first group of macros, as the input marked-up text stream is read in each tag in the stream is compared with the macros in that group (as read from configuration file). If a tag matches, the template defined tag definition (this is the new tag instruction) is inserted. Some of the new tags may be formed using parameter replacement. This takes the parameter from the source tag, and inserts it into the marked space in the destination tag instruction (defined by the template).

As an example, a portion of the input marked up text stream may be:

Hello, I am <action src="Forward"/> a virtual character.

Inside the MacroExpander initialisation file, the following expansion rule exists.

CreateMacro <action> <playanim \
file="c:/Clip/$src$.lws" playbackrate="$rate$"/> \
<playmorph file="C:/Clip/$src$.giz" \
object="charhead" playbackrate="$rate$"/>

(Where \ indicates a continuation onto the next line.)

The MacroExpander recognises the <action> tag as being a macro, and expands it based on the corresponding rule. The final Output is:

Hello, I am <playanim
file="c/Clip/Forward.lws"/><playmorph
file="C/Clip/Forward.giz" object="charhead" /> a
virtual character.

Note that the play back rate variable has been removed from both tags. This is because no parameter has been found for it. So we can see that the macro expander has expanded this simple tag into two much more complicated ones.

FIG. 2 shows a flow diagram illustrating in detail the processing steps carried out by the Macro-Expander. As shown, the data stream is passed through the Macro Expander again for every group of macros still to be compared with the input tag stream. Any new tag instructions generated by the Expander in one pass are not subject to further processing in the same pass, although a subsequent pass may modify them.

Finally the data is written out again as a new, modified, marked-up text stream (consisting of the stream of new tag instructions) for input to the Random-Inserter subsystem.

Random Inserter

The Random-Inserter can insert groups of tags based on random numbers. This is used to allow a certain random element to be present in the system. Although anything is possible, the current system randomly emphasises the start of stories and breathing. Random insertion takes place at random insertion point tags present in the (modified) marked up text stream which tags are normally created by the Macro Expander. Alternatively though the random insertions could be inserted directly into the (modified) marked up text stream.

At initialisation, the Random Inserter reads in its configuration options from a configuration file specified therefor. These define groups of random tags, the percentage chance of each such group being activated, and a weighting to the individual tags within the group. When a random insertion point tag is encountered in the (modified) marked up text stream (FIG. 3), a "roll-of-the-dice", compared with its internal percentage probability, determines whether the random insertion point tag is to be activated or ignored. If chance gives it the go-ahead, a second selection process takes place. The group contains several optional sequences, each with different weightings. A random selection biased by these weightings decides which sequence of new tag data will be inserted in the text stream. The Randon-inserter configuration file can specify a number of tag groups. Each tag group has a name, a probability, and a suppression value. While processing the incoming marked up text stream it looks for Insertion tags. Each Inserter tag has a name which is matched against the appropriate tag group's name. An Inserter tag can have a number of control states. For the normal control state we compare the suppression value with the number of occurrences of this Inserter group since the last insertion for that group. If the suppression value is higher then we move on to the next tag. If not, then we compare the tag group's probability to a randomly generated number to determine whether we continue. Each tag group can contain a number of tag sequences each associated with a weighting number. If an insertion goes ahead, then one of the tag sequences will be randomly chosen but those with a higher weighting number are more likely to be selected. Other Inserter tag control states allow a group to be completely deactivated or reactivated, to force an insertion to occur, to update counter but avoid the insertion, or to temporarily change the suppression value until the next insertion.

Finally, this new tag data (selected from the stored list of instruction tags, as discussed above) is written into the marked-up text stream, and passed on to the text-to-speech converter.

Text-to-speech Converter

The text to speech converter 3, whose operation is illustrated in detail in FIG. 4, incorporates the Lernout-and-Hauspie ("L&H") RealSpeak SDK text-to-speech engine to provide the voice for the virtual character. Initially, every tag (in the marked up text stream received by the text-to-speech converter) specifying an action to be taken by the Character Animation System (hereinafter referred to as "CAS") is placed in a new and temporary sequential list. The non-text tags in the new list are replaced in the marked up text stream by L&H bookmarks to flag them as "uninteresting" (FIG. 4).

Pronunciation tags allow the main body of text to contain the correct spelling of words but specify an exact pronunciation of the word which may not be otherwise deducible by machine. Pronunciation tags come in pairs which bracket a piece of text. The first tag specifies an alternate pronunciation for the bracketed text. For example, "This is a <pron phonetic="lyv">live</pron> television broadcast" and "I <pron phonetic="liv">live</pron> in Glasgow". In the Text-to-speech converter when the first pronunciation tag in a pair is encountered any subsequent text (and tags) up to the second pronunciation tag is discarded. The text of the replacement pronunciation is then added to the text to be sent to the L&H system. The tags which control speech (mainly those tags incorporating control voice parameters) are converted to codes that the L&H system recognises internally. As the engine processes the text stream, when it comes across an L&H bookmark it activates a call-back procedure so that the original tags (which were replaced by the bookmarks) are activated from the tag list and passed to the framework system (for further processing in the rest of the CAS), together with rest of the output from the L&H engine, through a conventional callback function (used by the engine to deliver or obtain information from the framework system).

The output from the L&H engine is passed to the framework in information blocks. The information blocks contain PCM audio data, phoneme data, bookmark data and word marker data. The data for word markers and phonemes are extracted along with timing information, and written into a phoneme stream (i.e. sequence of phoneme tags). The phoneme stream is then passed down to the Phoneme-to-Viseme module. The PCM audio data is written into an audio data stream.

Some of the tags activated from the tag list by the call-back function require additional processing by the text to speech engine. These add longer pauses, or can be used to add audio into the audio stream for playing audio queues etc. Any other tags are time-coded and added to a mark-up stream which is output from the text-to-speech converter for further processing by later modules.

Finally, the audio stream containing the PCM data is passed on from the text-to-speech module for processing by the rest of the system. (In fact it is passed directly to the renderer 15, described below.)

The timing information contained in the phoneme stream and mark up stream will now be described in further detail. Each phoneme tag in the phoneme stream, and each tag in the mark-up stream, is marked as occurring at a particular time, measured in seconds. This is the actual time at which the event should take place in the final animation.

This timing information is then added to the phoneme-stream and the marked-up text stream. Each phoneme tag in the phoneme stream, and each tag in the marked-up stream, is thus marked as occurring at a particular time, measured in seconds. This is the actual time at which the event should take place in the final animation.

The newly modified mark-up stream now passes from module to module. All instruction tags are now coded so that the other modules can work out when each instruction should be carried out.

The timings in the phoneme stream are used by the phoneme to viseme module (described below) to synchronise the facial animation with the generated sounds.

When the animation and morph modules (described below) are processed, they take the times from the instructions in the mark-up stream and use this to insert morph or animation sequences at the correct time in the animation into the morph and animation streams respectively.

As the streams pass into the renderer, the animation, the morph and the mark-up streams all have timing information attached. These times are used to calculate the positions and shapes of objects at each rendered frame.

Phoneme-to-Viseme Mapper

The phoneme to viseme module 4, an overview of the function of which is given in FIG. 5(a), and the detailed operation of which is shown in FIGS. 5(b) and (c), takes the phonemes in the phoneme stream generated by the text-to-speech engine, and maps them to associated visemes. The application uses 10 viseme (A to J) shapes, and this is enough to represent good lip-synching. The system starts with a direct one to one mapping, then removes what it considers to be unnecessary phonemes.

The phoneme list is configurable in that none of the actual phonemes are hard-coded. They are specified in a configuration file. This ensures that the text-to-speech engine can be switched to a different text-to-speech engine, if required. As long as time coded phonemes are generated, the system can handle it. Except for the direct one to one mapping, all the other steps can also be switched on or off with the use of the configuration files.

Stage 1

The tags in the phoneme stream are processed one by one, in turn, as illustrated in FIG. 5(b), so as to generate a series of time-marked phonemes (in practice this series may be stored in the form of an array). For example, a phoneme stream for the phrase "Hello, this is a test" generates the following phonemes:

| Time (seconds) | Phoneme | Active |
| --- | --- | --- |
| 0 | # | Yes |
| 0.449977 | # | Yes |
| 0.520635 | # | Yes |
| 0.62059 | E | Yes |
| 0.72059 | 1 | Yes |
| 0.774694 | O | Yes |
| 0.985488 | # | Yes |
| 1.31184 | # | Yes |
| 1.33075 | D | Yes |
| 1.38685 | I | Yes |
| 1.4537 | s | Yes |
| 1.52998 | I | Yes |
| 1.58159 | z | Yes |
| 1.64621 | $ | Yes |
| 1.72045 | t | Yes |
| 1.81324 | E | Yes |
| 1.96617 | s | Yes |
| 2.11098 | t | Yes |
| 2.20585 | # | Yes |

As can be seen from the table, phonemes have no one fixed duration, and the timing is quite variable from one to the next. A table of all the available phonemes from which from which the text-to-speech converter can select phonemes is included immediately herebelow:

| Phoneme Table | | |
| --- | --- | --- |
| Phoneme Character | Sound | Example Words |
| # | N/A | Break - Close mouth |
| i | Ee | Eat, feel, wheel |
| I | Short i | this, fill |
| E | Short e | Fell, well |
| ' | Short a | hang, cat |
| a | Ah | cart, father |
| Q | Short O | bother, cot, hot, pot |
| ^ | Short u | cut, mutt |
| o | Long a | fall, wall |
| U | U | Full |
| u | Oo | Fool |
| $ | Long ah | Allow |
| e | Er | Herd |
| J | Ay | Chaos (K - yos) |
| y | Oy | Foil |
| Y | Iy | File |
| @ | Ow | Foul |
| O | Oaw | Goal |
| i | Ear | Here |
| ' | Eh | Mary, there |
| £ | Ure | Sure |
| j | y | yes, yellow |
| w | w | why, wool |
| r | r | sorry, |
| l | l | Lip |
| p | P | pit, part |

-continued

Phoneme Table

| Phoneme Character | Sound | Example Words |
|---|---|---|
| P | P | pit, part |
| t | T | cart, tart |
| ' | T | Tom |
| k | C | Cart |
| K | C | Cart |
| b | B | Bother |
| d | D | dig, end, bridge |
| g | G | get |
| f | F | Father |
| T | Th | Thin |
| z | Z | Zeal |
| s | S | Sorry |
| S | S | Sheep |
| v | V | Vat |
| D | Th | father |
| Z | Z | Leisure |
| h | H | Hot |
| tS | Tch | Catch |
| dZ | Dj | Journal |
| m | M | merry, Mary, mummy |
| n | N | End |
| N | Ng | hang, bang, thing |

Stage 2

The next step is to mark any phonemes to be ignored as inactive in the list. These are identified from the following simple lookup table which is stored in a memory means accessible to the system:

Look-up Table
Generally Ignored Phonemes

N, n, dZ, tS, h, Z, s, z, r, l, t, AE, k, K, d, D, g, S

The phoneme list, with the inactive phonemes marked is thus:

| Time (seconds) | Phoneme | Active |
|---|---|---|
| 0 | # | Yes |
| 0.449977 | # | Yes |
| 0.520635 | H | No |
| 0.62059 | E | Yes |
| 0.72059 | L | No |
| 0.774694 | O | Yes |
| 0.985488 | # | Yes |
| 1.31184 | # | Yes |
| 1.33075 | D | No |
| 1.38685 | I | Yes |
| 1.4537 | S | No |
| 1.52998 | I | Yes |
| 1.58159 | Z | No |
| 1.64621 | $ | Yes |
| 1.72045 | T | No |
| 1.81324 | E | Yes |
| 1.96617 | S | No |
| 2.11098 | T | No |
| 2.20585 | # | Yes |

The removal of these phonemes helps to perform a smoothing action on the visemes. Without this the mouth will be seen to "pop" about a lot. That is, there will be too much movement from frame to frame, and the final animation will seem a little bit jerky.

In a possible modification of the above, if a particular phoneme is the start of a word, we mark that phoneme as being the start of a word. If we wish all phonemes at the start of words to be active (this may help pronunciation in the final animated character), we can then ensure that all such marked phonemes are made active (even if previously marked inactive because it is a generally ignore phoneme). This optional modification is included in FIGS. 5(b) and (c).

The resulting phoneme array data can be used as part of the final output. However, it should be noted that a few problems can arise. The following stages have been brought in to combat this.

Stage 3

The next stage starts looking at the morph targets (i.e. visemes) for each of the individual phonemes. The morph targets we use for the various phonemes are labelled A to J as follows:

| Morph Target | Phonemes |
|---|---|
| A | ' |
| B | I, i |
| C | Q, J |
| D | Y, O |
| E | I, r, l, t, k, K, z, s, S, Z, n, N |
| F | F, v |
| G | ', a, $, g, tS, dZ, |
| H | E, ˆ, e, Y, j, h |
| I | p, P, b, m |
| J | o, U, u, @, £, w, ', d, T, D |

If two identical phonemes are active one after the other, and another deactivated phoneme is located between them, it is re-activated. This is to try to obtain a smoother motion, and in many cases to split up similar phonemes. Applied to stage 2, this gives:

| Time (Seconds) | Phoneme Character | Active | Morph Target |
|---|---|---|---|
| 0.000000 | # | Yes | N/A |
| 0.449977 | # | Yes | N/A |
| 0.520635 | h | No | Target H |
| 0.620590 | E | Yes | Target H |
| 0.720590 | l | No | Target E |
| 0.774694 | O | Yes | Target D |
| 0.985488 | # | Yes | N/A |
| 1.311837 | # | Yes | N/A |
| 1.330748 | D | No | Target J |
| 1.386848 | I | Yes | Target E |
| 1.453696 | s | Yes | Target E |
| 1.529977 | I | Yes | Target E |
| 1.581587 | z | No | Target E |
| 1.646213 | $ | Yes | Target G |
| 1.720454 | t | No | Target E |
| 1.813243 | E | Yes | Target H |
| 1.966168 | s | No | Target E |
| 2.110975 | t | No | Target E |
| 2.205850 | # | Yes | N/A |

FIGS. 6(a) to (e) illustrate in two-dimensional pictures the five visemes used in the "Hello, this is a test" example phrase. It will be appreciated, though, that in fact each viseme is a predefined three-dimensional shape. The five visemes each incorporate a substantial portion of the character's head, neck and shoulders, as well as the whole of the character's face. (The character in this example is a male newscaster.) As indicated above, the morph target is the complete head without any hair or eyes and, as such, only the head is morphed. Each morph target in fact consists of its own set of keyframes. For example:

| Time | Expression | % Morph |
| --- | --- | --- |
| 0 Seconds | Smile | 0% |
| 1 Second | Smile | 100% |
| 2 Seconds | Smile | 0% |

If we imagine that time passes from 0 to 2 seconds. At Time 0, the face would be in a neutral position. As time moves forward, at 0.5 seconds, the face will be half way between a smile and neutral, until at one second the smile is fully active. Then the reverse would happen and the face would morph again back to the neutral pose as time approached 2 seconds.

(As the system runs, many different expressions could be active at once, all of which could potentially have keyframes at completely independent points in time).

Stage 4

The final stage before output checks whether any of the defined consonants are separated by a vowel. The consonants we use are defined as below:

Defined as Consonants m, T, D, P, p, v, f, b, n

If any of the defined consonants are separated by a vowel, the start and stop timings of these phonemes are altered so as to smooth the output of the system even further. This is done by leaving the vowel in an active state until the close of the second consonant. This blends the two morph targets together for a longer period of time. For example, in the example shown in FIG. 7(a) the pale lines show the activation status of the vowel, and the dark lines show the activation status of the consonants. Without the adjustment to the morph stream due to blending, the timing would be as shown in FIG. 7(a). However, with the blending the vowel is kept active for longer, as shown in FIG. 7(b). Because the vowel is active for longer, a smoother transition takes place. (The motion shown in FIGS. 7(a) and (b) would in practice be implemented using spline curves, as later described with reference to FIGS. 13(a) and (b)).

Output Stage

Finally, the data is prepared for output from the phoneme to viseme module. The inactive phonemes are removed completely and discarded. From this point onwards they are never required again, and the following timings operate better without them.

To activate the morph targets properly, the targets are set to 'Off' at the previous phoneme's activation time and 'On' at the current phoneme's activation time. Then 'Off' again at the next phoneme's activation time. This can be seen from the following table.

| Time (Seconds) | Phoneme | Target D | Target E | Target G | Target H |
| --- | --- | --- | --- | --- | --- |
| 0.000000 | # | | | | |
| 0.449977 | # | | | | Off |
| 0.620590 | E | Off | | | On |
| 0.774694 | O | On | | | Off |
| 0.985488 | # | Off | | | |
| 1.311837 | # | | Off | | |
| 1.386848 | I | | On | | |
| 1.453696 | S | | On | | |
| 1.529977 | I | | On | Off | |
| 1.646213 | $ | | Off | On | Off |
| 1.813243 | E | | | Off | On |
| 2.205850 | # | | | | Off |

It can be seen that very little of the original is active at any one time. In fact, only the vowels are active most of the time. However, the vowels are too limiting a set, and certain consonants are required, such as p, b, f, and w.

The morph target sequence is output from the phoneme to viseme module as a morph stream (i.e. sequence of morph target tags). The time-coded mark-up stream from the text-to-speech converter 3 passes through the phoneme to viseme module and is output therefrom.

Morph Player

The morph player 5 is a relatively simple subsystem. Its operation is illustrated in FIGS. 8(a) and (b). It accepts the time-coded mark-up stream of data input from the phoneme to viseme module, containing instructions (tags) which tell it when to insert morph sequences (i.e. series of morph target keyframes) into the morph stream. Each morph sequence may comprise one or more morph targets, and each morph target may comprise one or more keyframes. Some of the morph sequences are pre-defined and loaded from a file when the system initialises. The rest are loaded as and when required.

The expressions in the morph sequences portray the current emotion of the character, typically smiling or frowning. In addition to these simplistic expressions, more complicated sequences of expressions can be inserted. These are read in from Morph Gizmo files (these are referred to as "Morph files" in FIG. 8(a)) as required. (Morph Gizmo is a lightwave plug-in, used for creating morphing sequences. Any graphics application package that provides this support can be used.) These complicated morph sequences (which can also be considered as discrete animations) may contain many different expressions, and would be difficult to implement using the simpler emotion type morph target tags.

The data to control the animation of the morph sequences is passed in the mark-up stream. This stream is passed down from module to module (see FIG. 1) and contains information and instructions about how to process the scene. In the case of the morph player 5, this information describes when and where to apply the morph sequences (the "morphs") and what type of morph to use 9 expression morph keyframes, or Morph gizmo files). The morphs are inserted into the morph stream in their appropriate positions determined by the time-codes of the instruction tags therefor contained in the mark-up stream. While the morph sequence data is merged with the morph stream, it is important to note that it is independent of it. That is, the phonemes have no influence over what happens in the morph player module 5.

Finally, to ensure that fully self-contained animations (resulting from the inserted expression morph sequences or Morph Gizmo files) are not interfered with by subsequent adjustments, simple markers are added to the mark-up stream. These markers describe the morph target, and the duration over which it is active. This allows the morph randomiser (see below) to recognise when the software is separately animating any of the targets it randomises, and leave it alone. This process is illustrated in FIG. 8(b).

Morph Randomiser

The morph randomiser 6 is used to add random facial movement to the character, though it can be applied to anything that is morphed. In the preferred embodiment of the system, the Morph Randomiser is used to make the character blink, and to add a small amount of random head movement.

On initialisation, this module processes the morph stream output from the Morph Player so as to load descriptions of which objects and morph targets are to be randomly morphed, and how often and how much they are to be morphed by. After initialisation, the module checks whether the morph player is controlling any objects. If so, it identifies where these objects are key framed, and makes some internal exclusion sections, to avoid overwriting them. This is shown in FIG. 9(b). Finally, skipping these exclusion sections (where current time is not a valid time block), it generates random motions based on the relevant values, and adds them to the information in the morph stream.

FIGS. 15(a)–15(tt) show a representative animation sequence of a head of a news announcer, as assembled from the set of visemes A–J partially illustrated in FIGS. 6(a)–6(e). The illustrated animation sequence is a markup morph stream before the morph randomizer of the invention is applied. To discern the animation, the figures should be placed on separate pages, one figure per page, and rapidly thumb-flipped. It will be noted that while the mouth is seen to move, the rest of the head is motionless and expressionless.

FIGS. 16(a)–16(tt) illustrate this markup morph stream after effects from a morph randomiser according to the invention have been applied. This sequence of figures can be viewed in a manner similar to that described above to discern the animation effects. These effects include blinking of the eyes and a slight swiveling of the head. The incorporation of these morph randomizations produces a more lifelike animation sequence.

Animation Player

The animation player 7 is very similar in design to the morph player 5. However, it works with gross positional information of objects (such as the head, upper arms, torso and fingers of the virtual character) within the graphical scene. This gross animation is used to set the character's physical posture.

The animation player takes as its input the time-coded mark-up stream passed on from the morph randomiser. This mark-up stream contains data and instructions on how the scene should be processed. At marked points in the mark-up stream instructions are given (tags) to the animation player to insert an animation into the stream. The animation is then loaded from a Lightwave scene file (any animation package could theoretically be used), and any animating components in the scene are then transferred over into an animation stream which is output from the animation player (see FIG. 10(a)). As with the morph player, simple markers are added to the mark-up stream, as shown in FIG. 10(b), to ensure that fully self-contained animations are not interfered with by subsequent adjustments made by the system. These markers describe the object, when it starts animating, and how long it animates for. This allows the animation randomiser (see below) to recognise when pre-canned animations are taking place, and avoid interfering with them.

Finally, the animation player also generates information on where objects are placed after animations have been completed, (including the object rotation and scale). This information is incorporated in the mark-up stream. This information is used further down the system to allow random motions to occur in newly formed positions. As an example, if the character leaned forward any subsequent random motions would then be based around this leaning-forward position. For example, if a random variation (stretch horizontally, as a broad general example) is applied to an object, this is an instruction to the object in isolation (standing vertically, probably). If the object is tilted and then stretched horizontally in its tilted position it will become horribly distorted. Therefore, the tilt (or "lean-forward") must be applied to the model independently, and the random variations applied to the altered model.

Animation Randomiser

Like the Morph Randomiser, this module 8 applies random animations to the virtual character, in this case the head as a whole, or the body. When the module initialises, it loads descriptions of what objects are to be randomly animated from the Morph Randomiser configuration file. These include details of how often and by how much each object is to animate.

As with the Morph Randomiser, for each time-section in the mark-up data stream the Animation Randomiser identifies whether the animation player is controlling it and, if so, random animation is ignored. This is done in the same way as for the Morph Randomiser, by creating time blocks for each object and identifying whether the time block is valid according to whether or not the Animation player is controlling the animation in that time block, as shown in FIG. 11(b).

If a time block is valid, the Animation Randomiser 8 creates animation key frames for the objects, ensuring that their current locations are used if these are different from their default starting positions. Randomisation is done by offsetting these key frames with small adjustments. This keyframe information is then added to the animation stream for processing by the rendering subsystem. In effect, the animation is 'nudged' a bit to avoid the wooden-ness of immobility or precise repetition.

Renderer

The renderer 15 is split into two separate systems: the real-time renderer 9 and an alternative renderer 10. The real-time renderer 9 is the primary renderer, and is used in the day to day running of the system. The two renderers are interchangeable, this being a benefit of the CAS being modular in nature.

There are two individual renderers for several reasons. The alternative renderer was quicker and faster to develop and allowed development of the rest of the technology, and development of the real-time renderer to continue at the same time. The alternative renderer also allows Hi-Resolution rendering with Lightwave, which although it takes longer, produces much higher quality images.

Both renderers take in the animation stream, the morph stream and the mark-up stream and the PCM data (the audio stream), and then process it to produce the final output.

A) Real-time Renderer

This renderer 9 is responsible for displaying the data calculated by the rest of the system in real-time. On initialisation the configuration file for the real-time renderer is read. This sets various options within the real-time renderer. Most of these can be overwritten with data contained in the mark-up stream (if desired).

When the real-time renderer processes, it accepts the data from the input animation, morph, audio and mark-up streams which contain most (or all) the information required for the system to render the talking virtual character. The first required piece of information is the name of the scene which is to contain the talking character. The "scene" is an industry-standard Lightwave file containing information which places objects in a hierarchy. The work (processing) carried out on the data stream up to this point was done on individual objects in isolation.

Part of the hierarchy is an object called the "puppet". This is a textured full-bodied character which is an original model contained in the Lightwave scene file. Other objects, such as arms, hands and the head are marked as being sections of the puppet. These "sections" are the sections of the character's body, identified as being subject to modification by the Animated Character System. These sections are used to deform the full-bodied character of the puppet into the final pose, as required by the animation, but the sections are not themselves ever drawn.

The scene adds any objects (for example, static background objects) which do not require animation, and provides the hierarchy which pulls it all together. Normally, the name of the scene file is contained in the data stream, but if it is absent a default scene file name is obtained from the configuration file.

This hierarchy specified in the scene represents the character and is built in this way to allow composite transformations to be performed. For example, to transform the hand, the wrist must first be transformed.

After the hierarchy has been built, the next step is to render the data. An option can be specified in the configuration file or the mark-up stream to tell the system where to send the renders. The options are: render to the screen in real-time mode, render to a Microsoft AVI file, or render as a Targa image sequence. Generally, when the scene renders, each image is at a set time difference from the previous frame (for example ⅕th of a second). However, when rendering to the screen in real-time mode, the renderer will render as fast as it can, achieving normally at least 25 frames per second, and in some cases upwards of 30 frames per second.

The rendering is split into three parts, namely morphing, animating and final rendering, which are described separately below. At each frame, the "current time" is calculated. This is the time relative to the beginning of playing the scene, at which the current frame is to be rendered. It is local to the renderer, and is not the time code embedded in the data stream instruction tags. If the current time is greater than a preset end time or if a user has pressed the "Escape" key (or equivalent) on the computer system in which the CAS is running, the Renderer is closed down and the character animation process is ended (see FIG. 12). The end time is generated by the Text-to-speech module which scans the entire text and generates timing codes, from which finish time can be calculated.

1) Morphing

Morphing is the first stage carried out by the renderer, this produces the talking head part of the virtual character. On initialisation the morph stream is passed to a "morpher" forming part of the renderer. (It will be appreciated that the morpher is in practice specific program code, provided in the renderer software, for carrying out the morphing.) The morpher loads each of the morph targets specified in the morph stream. As each morph target is loaded it is compared to an original "base" model, loaded from the Lightwave scene file, and converted into deltas (the differences between the two). If any of the deltas are zero, this is marked so that these points do not affect the rest of the head while the system is morphing.

As each frame time is processed, the morpher works out what morph targets are active. Each morph target's delta's are added to a "neutral" object, for example the default facial pose, these deltas are scaled by a value, which is calculated using the following formula:

%Morph=Hermite spline-calculated value based on surrounding morph keyframes (for this morph target)

TotalMorphs=Total percentage morphs for the entire object.

(That is if three morph targets affect the object, with values 80%, 50%, 30%. The TotalMorphs will be 160.

Scale Value=(%Morph*%Morph)/TotalMorphs

This ensures that morphs with a greater relative %morph have a stronger influence on the object.

Figure 13B:
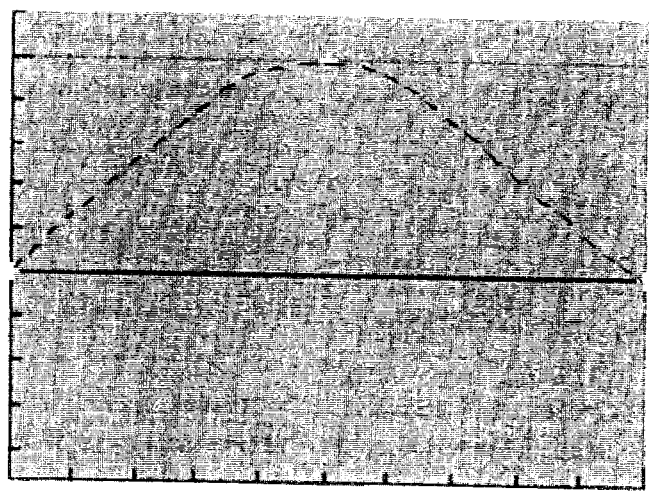

What is actually happening is that the motion between morph target keyframes is being smoothed. This is being done by interpolation. There are various ways to interpolate between keyframes. These methods can be simple "linear" motion i.e. a straight line between the values at regular intervals, as illustrated in FIG. 13(a). However, this is never very realistic for organic animation (e.g. human characters). Therefore, to achieve a smooth animation, instead of linear motion we employ spline-based motion. The splines used are "hermite" splines. These are documented and described in the graphics book *Computer Graphics: Principles and Practice* by Foley, van Dam et al., Addison Wesley (publishers), September 1995, ISBN 0201848406. FIG. 13(b) shows the same example as in FIG. 13(a), but this time interpolated using hermite splined motion. The sharp direction change seen in the linear motion example of FIG. 13(a) is what makes human motion look wrong. The spline example shows smooth motion into and out of the peak point in the graph. This makes the animation look more natural.

The object is now ready for final rendering.

2) Animating

The next phase of the system is to animate any moving parts of the character. This is done by an "animator" provided in the renderer (again, the animator is program code provided in the renderer software). At initialisation, the animator is passed the animation stream. This details all the objects moving within the scene. These objects will include any moving parts of the character which is made up of several such "objects" arranged together to form a "puppet". The animator pre-processes this information, converting it into a more efficient internal (generic) format. This is a large structured array, introduced to make the process more efficient.

At each time specified, the real-time renderer parses the entire rendering hierarchy using a depth first methodology. At each node, the renderer queries the animator to check if each object has moved. If the object has moved, then the animator calculates its position and orientation based on the keyframe information provided to it. Again, this uses hermite splines to interpolate between keyframes, so as to smooth the animation over time and ensure no sharp animations are seen.

After each node's position and orientation has been updated, the object is transformed in 3D space. For information about 3D transformations and how these are effected see *Computer Graphics: Principles and Practice* by Foley, van Dam et al., Addison Wesley (publishers), September 1995, ISBN 0201848406.

Now the real-time renderer scans through each object querying if any other animation parameters such as object's opacity, light intensities and texture changes have changed. These changes are noted and applied before the final rendering stage, in known manner (see Foley, van Dam et al referenced above).

3) Render Frame (Final Rendering)

Final rendering of the objects takes place after the morphing and animating stages. The first step taken by the renderer is to "skin" the puppet. This is done by placing each section's transformed points on the equivalent points of the main puppet, averaging points where multiple sections join.

This process is called "skinning" because although the animated objects were in many parts, the final object has one smooth skin.

Next OpenGL is given the status of the lighting of the objects (intensities/positions etc.) Finally the rendering system then goes through each object, and renders it surface by surface. A 'surface' is a description of how a particular collection of triangles looks. Surfaces are rendered one at a time, to minimise the number of state changes sent through OpenGL. These state changes are usually very slow, and best kept to a minimum.

The rendering is done by passing pre-transformed vertex arrays and face information arrays to OpenGL (this is part of the OpenGL 1.1 standard). OpenGL transforms the objects into camera space, and calculates any lighting associated with this. This allows some use of hardware transformation(s) and lighting.

If the system is running is "batch mode" then the rendered scene (which is one "frame" is output to a memory of the computer system in which the CAS is running. The scene is stored in a file. In this mode, all frames of the animated image will be stored in this manner and can then be recalled at a later time, as desired, for display on one or more image display screens. Alternatively, if the system is not running in batch mode the rendered scene is displayed directly (e.g. on a display screen or by transmission across a computer network, such as the Internet, to user screens connected to the network) without the need to be stored.

Alternate Renderer

Instead of the Real-time renderer, an alternate type of renderer could be used, as above-mentioned. As the system modules have generic interfaces, another renderer can be written and inserted into the system without requiring any changes to the rest of the system. Only the main configuration file would need to change.

An alternate renderer which creates a Lightwave scene file, and a Microsoft WAV file could be used, for example.

Various modifications may be made to the embodiments hereinbefore described without departing from the scope of the invention. For example, the method and apparatus may be implemented using the flow chart of a minimal specification character animation system shown in FIG. 14 which consists of the basic steps of text-to-speech generation, conversion of phonemes to visemes, morph randomising, animation randomising and then real-time rendering. It is preferred to have all of the steps listed with respect to the embodiment shown in FIG. 1 but a person of ordinary skill in the art could also implement the invention with the arrangement shown in FIG. 14.

The computer program product is embodied in a CD or DVD or any other tangible medium and can be shipped as a separate unit or the program can be transmitted electronically to a remote location. The program can include code which allows a user or owner to create code for interaction with the program code so as to customise the animated image for certain requirements and applications. For example, the image may be customised to be a receptionist, museum guide, newsreader, tax adviser etc. The program may be incorporated into an embedded system, for example to display animated attendant, help-desk, receptionist or the like. The embedded system may be autonomous or coupled to a central control for updating the program controlling the animated image. For example, in the case of a virtual tax adviser, a client needs face-to-face advice on tax.

The Digital Animation Group Virtual Character Technology (CAS) supports a computer-based alternative to an inconvenient visit to the nearest tax office. An interaction application is built which contains a knowledge-base of tax matters and a means of interpreting the client's questions. The client is interactively guided through the knowledge framework to the answers he or she requires.

None of this is unique and a system of the kind described can be developed and operated using now common multimedia presentation methods. The difference that Digital Animation Group's CAS makes is to add a 'human face' to the process. The advisor across the desk returns, but this time in the form of a lifelike animation.

The 'division of labour' is clear. The application does the work and determines what information is to be passed to the client. The CAS determines how it is to be said and generates the talking image saying it. The CAS then is essentially a software 'plug-in', albeit a state-of-the-art one, providing the friendly, personal touch. This match can be repeated across a wide range of applications with little or no modification to the CAS itself.

Although the phonemes given relate to the English language it will be understood that phonemes from different languages may be used, for example, Spanish, French, Chinese, Russian, so that the virtual animated character can be used to 'speak' in one of a variety of languages with the facial movements and speech being matched in the selected language.

Applicant's co-pending U.S. patent application Ser. No. 09/767,242 filed on Jan. 22, 2001 discloses full details of virtual character technology used in various applications.

The principal advantages of the embodiments implementing the invention is that they provide a synthesised animated character which provides a much more realistic impression, i.e. closer to what is perceived to be natural human behaviour, than is possible with existing systems.

What is claimed is:

1. A method of generating an animated image of at least a head of a character which is speaking, the character's face having visible articulation matching words being spoken, the method comprising:

(a) processing an input stream of marked up text comprising text to be spoken by an animated character and a plurality of mark up instructions representing behavioural features to be implemented in the animated character, so as to replace recognisable ones of said mark up instructions with predefined modified mark up instructions, so as to convert said input stream of marked up text into a modified output stream of marked up text;

(b) processing said modified output stream of marked up text using randomising means so as to insert additional randomly selected mark up instructions into said modified output stream of marked up text, said randomly selected mark up instructions representing random behavioural features to be implemented in the animated character;

(c) processing said modified output stream of marked up text, with said additional randomly inserted mark-up instructions inserted therein, so as to produce: an audio signal stream for use in generating an audio signal representing said text being spoken; a phoneme signal stream representing a sequence of phonemes corresponding to successive portions of the audio signal; and a mark up instruction stream comprising mark up instructions for use in other processing phases of the method;

(d) processing said phoneme stream using phoneme-to-viseme mapping means so as to produce a morph target stream representing a series of morph targets, where a morph target comprises a predefined shape of the head of the character, wherein each said morph target in the series comprises a viseme, where a viseme comprises a predefined shape of the face containing a mouth of the character in a predetermined mouth shape matching a said phoneme;

(e) modifying said morph target stream using mark-up instructions contained in said mark-up instruction stream so as to produce a modified morph target stream representing a modified series of morph targets comprising said series of visemes having at least one further morph target inserted therein;

(f) processing said modified morph target stream, and said mark-up instruction stream, so as to generate an animated image of at least the character's head, said animated image comprising a sequence of image frames including image frames showing the character's face in said predefined shapes corresponding to the morph targets in said modified morph target stream; and (g) displaying said animated image on a display means synchronously with generating said audio signal from said audio signal stream so that the animated character appears to speak, the movement of the mouth portion of the character's face matching the phonemes in the audio signal.

2. A method as claimed in claim 1 wherein the method operates in real-time in the sense that said animated image of the character speaking audible words is generated on-the-fly from said second stream of marked up text, the image frames of the animated image being generated at a rate of at least 15 frames per second.

3. A method as claimed in claim 1 wherein said animated image is stored in a memory means for later playback.

4. A method as claimed in claim 1 wherein the modified mark up instructions which replace the recognisable mark up instructions in the first stream of marked up text, in step (a) of the method, comprise "expanded" mark up instructions which are specified by templates or "macros" stored in a memory means of a computer system means in which the method is implemented, with which templates said mark up instructions in said first stream of marked up text are compared (in step (a)).

5. A method as claimed in claim 1 wherein each morph target comprises a three-dimensional model mesh of a head of a character, including all the facial features of the character.

6. A method as claimed in claim 5 wherein at least one further morph target inserted into the series of visemes is a morph target in which the face has a predefined facial expression, such as a smile or a frown or is otherwise configured to provide additional expression in the final animated face.

7. A method as claimed in claim 6 wherein a sequence of morph targets is inserted so as to add more complicated additional expression to the face.

8. A method as claimed in claim 7 wherein an additional sequence of morph targets, including visemes are inserted to add particular words or phrases to the character's speech.

9. A method as claimed in claim 1 further including the step of inserting additional randomly selected morph targets into said modified series of morph targets, said additional morph targets providing random movements/expressions in the animated face to add authenticity to the face.

10. A method as claimed in claim 1 wherein each phoneme represented in said phoneme stream is mapped to a respective viseme.

11. A method as claimed in claim 1 wherein at least one of said phonemes and the respective visemes allocated therefor are then removed so that these visemes are not included in said first series of visemes, or said modified series of visemes.

12. A method as claimed in claim 11 wherein the phoneme(s) which are removed are those deemed unnecessary in order to sufficiently synchronize the mouth/lip movement of the final animated face to the text being spoken.

13. A method as claimed in claim 1 wherein the method includes processing said mark-up instruction stream so as to generate an animation stream comprising animation instructions for generating at least one predetermined animation.

14. A method as claimed in claim 13 wherein the animation instructions in the generated animation stream comprise one or more pregenerated sets of keyframes.

15. A method as claimed in claim 14 wherein the animation instructions comprise sequences of positional keyframes defining gross head and body movement of the character having the animated face, relative to the space in which the character is located.

16. A method as claimed in claim 13 wherein the method includes the step of introducing random animations to the animated image by adding to the animation stream additional, randomly selected, animated instructions for generating random movement in the animated character.

17. A method as claimed in claim 1 including the step of processing the modified morph target stream so as to animate or "morph" each morph target therein.

18. A method as claimed in claim 17 further including the step of interpolating positions between morph target keyframes specified by the modified morph target stream so as to achieve smooth and realistic mouth movement in the character's face in the final animated image.

19. A method as claimed in claim 18 further including the step of interpolating between the positional keyframes in the animation stream so as to achieve smooth motion in the final animated image.

20. A method as claimed in claim 19 further including the step of using a spline-based smoothing technique.

21. A method as claimed in claim 1 including the step of processing said modified morph target stream, said animation stream, said audio signal stream, and said mark-up instruction stream using renderer means to which generate and display, on a display means, the animated image, based on predefined data describing a scene to be animated, said animated image being synchronized to the audio signal which the renderer also generates from the audio signal stream.

22. A method as claimed in claim 21 including the step of performing the rendering in real-time.

23. A system as claimed in claim 1 wherein the morph targets in said modified morph target stream are similarly time-marked.

24. A system as claimed in claim 1 wherein the mark up instruction stream includes timing data for specifying the correct times at which morph targets and animation instructions are to be inserted into the morph target stream and animation stream respectively.

25. A system for generating an animated image of at least a head of a character which is speaking, the character's face having visible articulation matching words being spoken, the system comprising:

a first processing module for processing a first stream of marked up text comprising text to be spoken by an animated character and a plurality of mark up instructions representing behavioural features to be implemented in the animated character, so as to convert said first stream of marked up text into a second, modified, stream of marked up text by replacing recognisable ones of said mark up instructions in said first stream with predefined modified mark up instructions, wherein said first processing module includes mark up instruction recognition means comprising comparing means for comparing mark up instructions in said first stream with predetermined mark up instructions stored in a memory means accessible to the system;

a second processing module comprising randomiser means for processing said second stream of marked up text so as to insert randomly selected mark up instructions into said second stream of marked up text, said randomly selected mark up instruction representing random behavioural features to be implemented in the animated character;

a third processing module comprising text-to-speech converter means for processing said second stream of marked up text so as to produce: an audio signal stream for use in generating an audio signal representing said text being spoken; a phoneme stream representing a sequence of phonemes corresponding to successive portions of the audio signal; and a mark up instruction stream comprising mark up instructions for use in other processing modules of the system;

a fourth processing module comprising phoneme-to-viseme mapping means for processing said phoneme stream so as to produce a morph target stream representing a series of morph targets, where a morph target comprises a predefined shape of at least a portion of the face of the character, wherein each said morph target in the series comprises a viseme, where a viseme comprises a predefined shape of at least a mouth portion of the face containing a mouth of the character in a predetermined mouth shape matching a said phoneme;

a fifth processing module comprising morph target insertion means for modifying said morph target stream, using mark up instructions contained in said mark up instruction stream, so as to produce a modified morph target stream representing a modified series of morph targets comprising at least one further morph target inserted therein; and a sixth processing module comprising rendering means for processing said modified morph target stream and said mark up instruction stream, so as to generate an animated image of at least the character's head, said animated image comprising a sequence of image frames including image frames showing the character's face in said predefined shapes corresponding to the morph targets in said modified morph target stream; and for displaying, on a display means accessible to the system in use thereof, said animated image synchronously with generating the audio signal from said audio signal stream so that the character appears to speak, the movement of the mouth portion of the face matching the phonemes in the audio signal.

26. A system as claimed in claim 25 wherein the first stream of marked up text iterates through the first processing module a number of times, being further modified after each pass, before producing the second, modified stream of marked up text.

27. A system as claimed in claim 25 wherein the six processing modules are incorporated in a framework means of the system.

28. A system as claimed in claim 25 wherein each said module has interface means via which said module is interfaced with a respective complementary interface means provided in said framework means.

29. A system as claimed in claim 28 wherein said framework means is configured to control all transfers of data signals from any one said module to another said module and to ensure that all such transfers take place via said framework means.

30. A system as claimed in claim 29 wherein the framework means is configured to control the operation of the system such that each said processing module is operated in turn.

31. A system as claimed in claim 25 wherein the phonemes in said phoneme stream are time-marked such that the phoneme stream includes timing information for each phoneme in the phoneme stream, said timing information identifying the length of each phoneme in the final audio signal.

32. A system as claimed in claim 23 wherein each tag in the mark up instruction stream is marked as occurring at a particular time at which the event specified in the tag will take place in the final animation.

33. A computer program product comprising:

a computer usable medium having computer readable code means embodied in said medium for generating an animated image of at least the head of a character which is speaking, the character's face having visible articulation matching words being spoken, said computer readable code means comprising:

program code for processing a first stream of marked up text comprising text to be spoken by an animated character and a plurality of mark up instructions representing behavioural features to be implemented in the animated character, so as to replace recognisable ones of said mark up instructions with predefined modified mark up instructions, so as to convert said first stream of marked up text into a second, modified, stream of marked up text;

program code for processing said second stream of marked up text using randomising means so as to insert additional randomly selected mark up instructions into said second stream of marked up text, said randomly selected mark up instructions representing random behavioural features to be implemented in the animated character;

program code for processing said second stream of marked up text so as to produce: an audio signal stream for generating an audio signal representing said text being spoken; a phoneme stream comprising a sequence of phonemes corresponding to successive portions of the audio signal; and a mark up instruction stream comprising mark up instructions for use in other processing phases of the method;

program code for processing said phoneme stream using phoneme-to-viseme mapping means so as to produce a morph target stream representing a series of morph targets, where a morph target comprises a predefined shape of at least a portion of the face of the character, wherein each said morph target in the series comprises a viseme, where a viseme comprises a predefined shape of at least a mouth portion of the face containing a mouth of the character in a predetermined mouth shape matching a said phoneme;

program code for modifying said morph target stream using mark-up instructions contained in said mark-up instruction stream so as to produce a modified morph target stream representing a modified series of morph targets comprising said series of visemes having at least one further morph target inserted therein; and program code for: processing said modified morph target stream, using mark-up instructions contained in said mark-up instruction stream, so as to generate an animated image of at least the head of the character, said animated image comprising a sequence of image frames including image frames showing the character's face in said predefined shapes corresponding to the morph targets in the modified morph target stream; and displaying said animated image on a display means synchronously with generating said audio signal from said audio signal stream so that the character appears to speak, the movement of the mouth portion of the face matching the phonemes in the audio signal.

34. A computer program product as claimed in claim 33 whereby the computer readable code means is transferrable by means of an electrical carrier for storage and execution at a remote location from the computer usable medium, said computer readable code means being adapted to interact with code supplied by a third party to modify the animated image to comply with specific requirements of said third party.

35. A computer program product as claimed in claim 33 wherein said computer readable code means includes interactive code for interacting with computer code supplied by a third party to create a modified animated image.

36. A method of generating an animated image of at least a head of a character which is speaking, the character's face having visible articulation match words being spoken, the method comprising:

a) receiving an output stream of marked up text;

b) randomly inserting mark-up instructions therein so as to produce: an audio signal stream for use in generating an audio signal representing said text being spoken; a phoneme signal stream representing a sequence of phonemes corresponding to successive portions of the audio signal; and a mark up instruction stream comprising mark up instructions for use in other processing phases of the method;

c) processing said phoneme stream using phoneme-to-viseme mapping means so as to produce a morph target stream representing a series of morph targets, where a morph target comprises a predefined shape of the head of the character, wherein each said morph target in the series comprises a viseme, where a viseme comprises a predefined shape of the face containing a mouth of the character in a predetermined mouth shape matching a said phoneme;

d) modifying said morph target stream using mark-up instructions contained in said mark-up instruction stream so as to produce a modified morph target stream representing a modified series of morph targets comprising said series of visemes having at least one further morph target inserted therein;

e) inserting additional randomly selected morph targets into said modified series of morph targets, said additional morph targets providing random movements/expressions in the animated face;

f) processing said modified morph target stream, and said mark-up instruction stream, so as to generate an animated image of at least the character's head, said animated image comprising a sequence of image frames including image frames showing the character's face in said predefined shapes corresponding to the morph targets in said modified morph target stream; and g) displaying said animated image on a display means synchronously with generating said audio signal from said audio signal stream so that the animated character appears to speak, the movement of the mouth portion of the character's face matching the phonemes in the audio signal.

\* \* \* \* \*